United States Patent
Fratkina et al.

(10) Patent No.: US 7,337,158 B2
(45) Date of Patent: Feb. 26, 2008

(54) SYSTEM AND METHOD FOR PROVIDING AN INTELLIGENT MULTI-STEP DIALOG WITH A USER

(75) Inventors: Raya Fratkina, Yorktown Heights, NY (US); Monica Anderson, San Jose, CA (US); Mark Angel, Napa, CA (US); Max Copperman, Santa Cruz, CA (US); Scott B. Huffman, Redwood City, CA (US); David B. Kay, Los Gatos, CA (US); Robert Stern, Cupertino, CA (US); Jeffrey Rudy, San Jose, CA (US)

(73) Assignee: Consona CRM Inc., Indianapolis, IN (US)

( * ) Notice: Subject to any disclaimer, the term of this patent is extended or adjusted under 35 U.S.C. 154(b) by 322 days.

(21) Appl. No.: 10/889,888

(22) Filed: Jul. 13, 2004

(65) Prior Publication Data
US 2005/0055321 A1    Mar. 10, 2005

Related U.S. Application Data

(63) Continuation of application No. 09/798,964, filed on Mar. 6, 2001.

(60) Provisional application No. 60/187,472, filed on Mar. 6, 2000.

(51) Int. Cl.
*G06F 17/00*    (2006.01)
*G06F 7/00*    (2006.01)
*G06N 5/00*    (2006.01)
*G06N 5/02*    (2006.01)

(52) U.S. Cl. .............. 706/45; 706/46; 707/3; 707/104.1

(58) Field of Classification Search .......... 704/9; 706/45–46
See application file for complete search history.

(56) References Cited

U.S. PATENT DOCUMENTS

| 4,918,621 A | 4/1990 | Nado et al. |
| 5,034,898 A | 7/1991 | Lu et al. |
| 5,309,359 A | 5/1994 | Katz et al. |
| 5,377,103 A | 12/1994 | Lamberti et al. |
| 5,404,295 A | 4/1995 | Katz et al. |
| 5,412,804 A | 5/1995 | Krishna |

(Continued)

FOREIGN PATENT DOCUMENTS

WO    WO-97/38378    10/1997

(Continued)

OTHER PUBLICATIONS

Making knowledge visible through intranet knowledge maps: concepts, elements, cases Eppler, M.J.;□□System Sciences, 2001. Proceedings of the 34th Annual Hawaii International Conference on□□Jan. 3-6, 2001 Page(s):9 pp. □□*
Integrating concept mapping and semantic Web technologies for knowledge management Mularz, D.; Lyell, M.; Database and Expert Systems Applications, 2004. Proceedings, 15th International Workshop on Aug. 30-Sep. 3, 2004 pp. 449-453 Digital Object Identifier 10.1109/DEXA.2004.1333515.*

(Continued)

*Primary Examiner*—Michael B. Holmes
(74) *Attorney, Agent, or Firm*—Ice Miller LLP

(57) ABSTRACT

A method and system are disclosed for retrieving information through the use of a multi-stage interaction with a client to identify particular knowledge content associated with a knowledge map.

3 Claims, 19 Drawing Sheets

U.S. PATENT DOCUMENTS

| | | | |
|---|---|---|---|
| 5,553,226 A | 9/1996 | Kiuchi et al. | |
| 5,555,408 A | 9/1996 | Fujisawa et al. | |
| 5,568,640 A | 10/1996 | Nishiyama et al. | |
| 5,594,837 A | 1/1997 | Noyes | |
| 5,600,831 A | 2/1997 | Levy et al. | |
| 5,625,748 A | 4/1997 | McDonough et al. | |
| 5,625,767 A | 4/1997 | Bartell et al. | |
| 5,628,009 A | 5/1997 | Kikuta et al. | |
| 5,630,125 A | 5/1997 | Zellweger | |
| 5,644,740 A | 7/1997 | Kiuchi | |
| 5,655,116 A | 8/1997 | Kirk et al. | |
| 5,659,725 A | 8/1997 | Levy et al. | |
| 5,659,742 A | 8/1997 | Beattie et al. | |
| 5,671,333 A | 9/1997 | Catlett et al. | |
| 5,724,571 A | 3/1998 | Woods | |
| 5,754,938 A | 5/1998 | Herz et al. | |
| 5,768,578 A | 6/1998 | Kirk et al. | |
| 5,778,364 A | 7/1998 | Nelson | |
| 5,787,417 A | 7/1998 | Hargrove | |
| 5,794,050 A | 8/1998 | Dahlgren et al. | |
| 5,809,499 A | 9/1998 | Wong et al. | |
| 5,819,258 A | 10/1998 | Vaithyanathan et al. | |
| 5,835,905 A | 11/1998 | Pirolli et al. | |
| 5,845,270 A | 12/1998 | Schatz et al. | |
| 5,878,423 A | 3/1999 | Anderson et al. | |
| 5,887,120 A * | 3/1999 | Wical | 706/46 |
| 5,895,466 A | 4/1999 | Goldberg et al. | |
| 5,895,470 A | 4/1999 | Pirolli et al. | |
| 5,930,803 A | 7/1999 | Becker et al. | |
| 5,991,756 A | 11/1999 | Wu | |
| 6,006,218 A | 12/1999 | Breese et al. | |
| 6,006,225 A | 12/1999 | Bowman et al. | |
| 6,029,165 A | 2/2000 | Gable | |
| 6,055,540 A | 4/2000 | Snow et al. | |
| 6,061,675 A * | 5/2000 | Wical | 706/45 |
| 6,073,135 A | 6/2000 | Broder et al. | |
| 6,078,914 A | 6/2000 | Redfern | |
| 6,105,023 A | 8/2000 | Callan | |
| 6,112,172 A | 8/2000 | True et al. | |
| 6,151,584 A | 11/2000 | Papierniak et al. | |
| 6,167,370 A | 12/2000 | Tsourikov et al. | |
| 6,169,986 B1 | 1/2001 | Bowman et al. | |
| 6,169,992 B1 | 1/2001 | Beall et al. | |
| 6,177,932 B1 | 1/2001 | Galdes et al. | |
| 6,185,550 B1 | 2/2001 | Snow et al. | |
| 6,199,034 B1 * | 3/2001 | Wical | 704/9 |
| 6,233,575 B1 | 5/2001 | Agrawal et al. | |
| 6,236,989 B1 | 5/2001 | Mandyam et al. | |
| 6,243,713 B1 | 6/2001 | Nelson et al. | |
| 6,256,627 B1 | 7/2001 | Beattie et al. | |
| 6,269,362 B1 | 7/2001 | Broder et al. | |
| 6,282,538 B1 | 8/2001 | Woods | |
| 6,292,802 B1 | 9/2001 | Kessenich et al. | |
| RE37,431 E | 10/2001 | Lanier et al. | |
| 6,297,824 B1 | 10/2001 | Hearst et al. | |
| 6,301,579 B1 | 10/2001 | Becker | |
| 6,304,259 B1 | 10/2001 | DeStefano | |
| 6,314,420 B1 | 11/2001 | Lang et al. | |
| 6,347,313 B1 | 2/2002 | Ma et al. | |
| 6,347,317 B1 | 2/2002 | Singhal | |
| 6,359,633 B1 | 3/2002 | Balasubramaniam et al. | |
| 6,360,213 B1 | 3/2002 | Wagstaff et al. | |
| 6,411,962 B1 | 6/2002 | Kupiec | |
| 6,430,558 B1 | 8/2002 | Delano | |
| 6,434,550 B1 | 8/2002 | Warner et al. | |
| 6,438,579 B1 | 8/2002 | Hosken | |
| 6,446,061 B1 | 9/2002 | Doerre et al. | |
| 6,457,026 B1 | 9/2002 | Graham et al. | |
| 6,460,029 B1 | 10/2002 | Fries et al. | |
| 6,460,034 B1 | 10/2002 | Wical | |
| 6,493,697 B1 | 12/2002 | Stier et al. | |
| 6,502,091 B1 | 12/2002 | Chundi et al. | |
| 6,538,560 B1 | 3/2003 | Stobbe et al. | |
| 6,546,388 B1 | 4/2003 | Edlund et al. | |
| 6,549,949 B1 | 4/2003 | Bowman-Amuah | |
| 6,556,671 B1 | 4/2003 | Beauvois | |
| 6,581,056 B1 | 6/2003 | Rao | |
| 6,598,018 B1 * | 7/2003 | Junqua | 704/251 |
| 6,636,853 B1 | 10/2003 | Stephens, Jr. | |
| 6,643,640 B1 | 11/2003 | Getchius et al. | |
| 6,687,696 B2 | 2/2004 | Hofmann et al. | |
| 6,711,585 B1 * | 3/2004 | Copperman et al. | 707/104.1 |
| 6,714,920 B1 | 3/2004 | Arai | |
| 6,732,088 B1 | 5/2004 | Glance | |
| 6,766,320 B1 | 7/2004 | Wang et al. | |
| 6,801,906 B1 | 10/2004 | Bates et al. | |
| 6,808,392 B1 * | 10/2004 | Walton | 434/236 |
| 6,980,984 B1 * | 12/2005 | Huffman et al. | 707/3 |
| 7,080,082 B2 * | 7/2006 | Elder et al. | 707/100 |
| 7,092,866 B2 * | 8/2006 | Rokosz | 703/17 |
| 7,103,609 B2 * | 9/2006 | Elder et al. | 707/102 |
| 7,130,844 B2 * | 10/2006 | Elder et al. | 707/3 |
| 7,206,778 B2 * | 4/2007 | Bode et al. | 707/5 |
| 7,249,123 B2 * | 7/2007 | Elder et al. | 707/3 |
| 2002/0027567 A1 | 3/2002 | Niamir | |
| 2007/0033221 A1 | 2/2007 | Copperman et al. | |

FOREIGN PATENT DOCUMENTS

| | | |
|---|---|---|
| WO | WO-99/18526 | 4/1999 |
| WO | WO-2000077690 A1 | 12/2000 |
| WO | WO-2000167225 A2 | 9/2001 |

OTHER PUBLICATIONS

Using virtual reality to construct knowledge Downey, S.; Frontiers in Education Conference, 1998. FIE '98. 28th Annual□□vol. 1, Nov. 4-7, 1998 p. 392 vol. 1 Digital Object Identifier 10.1109/FIE.1998.736879.*

A knowledge visualization tool for teaching and learning computer engineering knowledge, concepts, and skills Saad, A.; Zaghloul, A.-R.M.; Frontiers in Education, 2002, FIE 2002, 32nd Annual vol. 1, Nov. 6-9, 2002 pp. T2F-7-T2F-10 vol. 1 Digital Object Identifier 10.1109/FIE.2002.1157945.*

Knowledge maps for knowledge mining: application to R&D/technology management Rouse, W.B.; Thomas, B.S; Boff, K.R.; Systems, Man and Cybernetics, Part C, IEEE Transactions on vol. 28, Issue 3, Aug. 1998 pp. 309-317 Digital Object Identifier 10.1109/5326.704556.*

Difficulty analysis for learners in problem solving process based on the knowledge map Rita Kuo; Wei-Peng Lien; Maiga Chang; Jia-Sheng Heh; Advanced Learning Technologies, 2003. Proceedings. The 3rd IEEE International Conference on Jul. 9-11, 2003 pp. 386-387.*

Knowledge system of engineering and technology management Pelc, K.I.; Technology Management : the New International Language, 1991 Oct. 27-31, 1991 pp. 550-553 Digital Object Identifier 10.1109/PICMET.1991.183712.*

Fuzzy cognitive maps over possible worldsSilva, P.C.; Fuzzy Systems, 1995. International Joint Conference of the Fourth IEEE International Conference on Fuzzy Systems and The Second International Fuzzy Engineering Symposium., Proceedings of 1995 IEEE International Conference on vol. 2, Mar. 20-24, 1995 pp. 555-560 vol. 2.*

Databases with deadline and contingency constraints Soparkar, N.; Korth, H.F.; Silberschatz, A.; Knowledge and Data Engineering, IEEE Transactions on vol. 7, Issue 4, Aug. 1995 pp. 552-565 Digital Object Identifier 10.1109/69.404029.*

Visualization of Knowledge Structures Lin, Xia; Zhang, Dongming; Information Visualization, 2007. IV '07. 11th International Conference Jul. 4-6, 2007 pp. 476-484 Digital Object Identifier 10.1109/IV.2007.132.*

Knowledge maps for knowledge mining: application to R&D/technology management Rouse, W.B.; Thomas, B.S.; Boff, K.R.;

Systems, Man and Cybernetics, Part C, IEEE Transactions on vol. 28, Issue 3, Aug. 1998 pp. 309-317 Digital Object Identifier 10.1109/5326.704556.*

Building Knowledge Flow of Textual Topics for the e-Science Knowledge Grid Luo, Xiangfeng; Yu, Zhian; Grid and Cooperative Computing, 2007. GCC 2007. Sixth International Conference on Aug. 16-18, 2007 pp. 693-700 Digital Object Identifier 10.1109/GCC.2007.53.*

Fuzzy cognitive maps over possible worlds Silva, P.C.;Fuzzy Systems, 1995. International Joint Conference of the Fourth IEEE International Conference on Fuzzy Systems and The Second International Fuzzy Engineering Symposium., Proceedings of 1995 IEEE International Conference on vol. 2, Mar. 20-24, 1995 pp. 555-560 vol. 2.*

Exploring Cognitive Difference in Education using Average Path Length of Concept MapLi, Yan-Ru; Tong, Guo-En; Hong, Chao-Fu; Wang, Leuo-hong;Systems, Man and Cybernetics, 2006. ICSMC '06. IEEE International Conference onvol. 3, Oct. 8-11, 2006 pp. 2133-2136 Digital Object Identifier 10.1109/ICSMC.2006.385176.*

"(Kanisa™) Intelligized Business Processes", (1998), 12 pgs.

"About the Information Manifold", http://portal.research.bell-labs.com/org/ssr/people/levy/manifold.htm, (1998), 1 pg.

"FAQ—Connect Care by ProAmerica", http://www.proam.com/splash/faqscon.html, (1998), 3 pgs.

"IBM Version 2—Intelligent Miner for Data", http://www.software.ibm.com/data/iminer/fordata/brochure, (1988), 2 pgs.

"IBM Version 2.1—Intelligent Miner for Data", (1998), 2 pgs.

"IBM's Data Mining Technology", International Business Machines Corporation, First Edition, (1996), 25 pgs.

"Industry Solutions: Markets and Applications", http://www.proam.com/splash/HWSWfr.htm, (Nov. 19, 1998), 3 pgs.

"Kana Communications—Success Story: eBay", (Nov. 1998), 4 pgs.

"Kana Communications—Success Story: Netscape", (Nov. 1998), 4 pgs.

"ProAmerica Connect Care—The First Customer Care Software", (1998), 12 pgs.

"ProAmerica Redefines Customer Care with Visual Warehouse", International Business Marchines, (Feb. 1998), 2 pgs.

"Quality Connect", http://www.proam.com/splash/qualitycon.html, (1998), 2 pgs.

"Sales Connect", http://www.proam.com/sphash/surverycon.html, (1998), 1 pg.

"SCM—Theory of Customer Care, ProAmerica", (1996), 31 pgs.

"Support Connect", http://www.proam.com/splash/supportcon.html, (1998), 4 pgs.

"Survey Connect", http://www.proam.com/splash/surveycon.html, (1998), 1 pg.

"The Kana Customer Messaging System", http://www.kana.com/products/overview.html, (Nov. 25, 1998), 2 pgs.

"Using the Intelligent Miner in a Simple Scenario", *Version 2.1.1, IBM*, (Apr. 1998), 41 pgs.

"Web Connect", http://www.proam.com/splash/webcon.html, (Nov. 1998), 2 pgs.

Buckley, J. P., "A Hierarchical Clustering Strategy for Very Large Fuzzy Databases", *IEEE International Conference on Systems, Man and Cybernetics*, 4, (1995), 3573-3578.

Chakrabarti, S., "Scalable Feature Selection, Classification and Signature Generation for Organizing Large Text Databases into Hierarchical Topic Taxonomies", *The VLDB Journal*, 7, (1998), 163-178.

Li, W.-S., "PowerBookmarks: A System for Personalizable Web Information Organization, Sharing, and Management", *Proceedings, ACM SIGMOD—International Conference on Management of Data*, 28, (1999), 565-567.

Magennis, M., "The Potential and Actual Effectiveness of Interactive Query Expansion", *Annual International ACN-SIGIR Conference on Research and Development in Information Retrieval*, (1997), 324-332.

Stodder, D., "Toward Universal Business Intelligence: An Interview with Janet Pema", http://www.db2mag.com/ (1997), 6 pgs.

Tkach, D. S., "Information Mining with the IBM Intelligent Miner Family", *An IBM Software Solutions White Paper*, (1998), 1-29.

Wong, J.W., "Action: Automatic Classification for Full-Text Documents", *SIGIR Forum*, 30(1), (1996), 26-41.

"Amazon.com web archive", http://web.archive.org/web/19991013091817/http://amazon.com, Web page from Oct. 13, 1999; Copyright 1996-1999; retrieved Jan. 7, 2007, 2 pgs.

"eBay—Your Personal Trading Community", http://web.archive.org/web/19990117033159/pages.ebay.com/aw/index.html, Page last updated Jan. 16, 1999; Copyright 1995-1998; retrieved Jan. 12, 2007, 1 pg.

EP Office Action, EPC Patent Application No. 00939890.0 dated Jul. 29, 2004, 3 pgs.

Final Office Action mailed Jan. 27, 2005 in U.S. Appl. No. 09/911,839, 18 pgs.

Final Office Action mailed Jan. 31, 2007 in U.S. Appl. No. 09/911,839, 18 pgs.

Final Office Action mailed Feb. 15, 2004 in U.S. Appl. No. 09/944,636, 7 pgs.

Final Office Action mailed Apr. 3, 2006 in U.S. Appl. No. 09/798,964, 13 pgs.

Final Office Action mailed Apr. 6, 2005 in U.S. Appl. No. 09/944,636, 6 pgs.

Final Office Action mailed May 4, 2007 in U.S. Appl. No. 09/944,636, 20 pgs.

Final Office action mailed Jul. 14, 2006 in U.S. Appl. No. 09/944,636, 14 pgs.

"InQuira Information Manager Data Sheet", *Information Manager for InQuira 7*, (2005),2 pgs.

International Preliminary Examination First Report mailed Jun. 3, 2002 in Int. Application No. PCT/US01/07056, 10 pgs.

Non Final Office Action mailed Jan. 12, 2006 in U.S. Appl. No. 09/944,636, 12 pgs.

Non Final Office Action mailed Jan. 27, 2005 in U.S. Appl. No. 10/044,264, 14 pgs.

Non Final Office Action mailed Jan. 6, 2006 in U.S. Appl. No. 09/911,839, 17 pgs.

Non Final Office Action mailed Nov. 20, 2006 in U.S. Appl. No. 09/944,636, 17 pgs.

Non Final Office Action mailed Apr. 9, 2004 in U.S. Appl. No. 09/911,839, 11 pgs.

Non Final Office Action mailed Jul. 19, 2006 in U.S. Appl. No. 09/911,839, 14 pgs.

Non Final Office Action mailed Aug. 27, 2004 in U.S. Appl. No. 09/944,636, 10 pgs.

Non Final Office Action mailed Sep. 26, 2003 in U.S. Appl. No. 09/944,636, 9 pgs.

Non-Final Office Action, Mailed Oct. 31, 2002 in U.S. Appl. No. 09/594,083, 17.

Non Final Office Action mailed Oct. 4, 2005 in U.S. Appl. No. 09/798,964, 8 pgs.

Notice of Allowability, Mailed Apr. 18, 2003 for U.S. Appl. No. 09/594,083, 6.

Notice of Allowance, Mailed Mar. 14, 2007 for U.S. Appl. No. 10/610,994, 10.

Notice of Allowance, Mailed Jun. 19, 2006 for U.S. Appl. No. 10/610,994, 25.

Notice of Allowance, Mailed Mar. 14, 2003 for U.S. Appl. No. 09/594,083, 11.

Notice of Allowance mailed Jul. 10, 2006 for U.S. Appl. No. 09/798,964, 10 pgs.

Supplemental Notice of Allowability, Mailed Feb. 26, 2007 for U.S. Appl. No. 10/610,994, 20.

Supplemental Notice of Allowability mailed Sep. 27, 2006 for U.S. Appl. No. 09/798,964, 5 pgs.

WO 2000077690 Search Report, PCT Search Report of International Application No. PCT/US00/16444, 4 pgs.

Written Opinion mailed Feb. 26, 2002 in International App. No. PCT/US01/07056, 2 pgs.

* cited by examiner

Follow-up Questions

- SYSTEM ASKS USER FOLLOW-UP QUESTIONS BASED ON ACTIVE GOALS
  - CQ: CLARIFYING QUESTION
  - DQ: DOCUMENT QUESTION
  - TEXT QUESTION

- SYSTEM CAN OFFER USER A CACHED QUESTION
  - PQ: PARAMETERIZED QUESTION

FIG. 13

TQ - Text Question

WHAT KIND OF BREAKFAST FOOD WOULD YOU LIKE TO HAVE TODAY:

(PLEASE TYPE IN)

| Scrambled eggs |
|---|

- TAXONOMY NAVIGATION- QUESTION
- USER TYPES IN TEXT THAT WILL BE AUTOCONTEXTUALIZED TO A PLACE IN THE TAXONOMY

FIG. 15

DQs - Document Driven Question

THE FOLLOWING DISHES ARE LEFT IN THE KITCHEN.
PLEASE CHOOSE THE ONE(S) YOU WOULD LIKE TO GET:

| ✓ | Scrambled eggs |
|---|---|
| ☐ | Poached eggs |
| ☐ | Pancakes without syrup |

- ANOTHER KIND OF FOLLOW-UP QUESTION
- BASED ON THE SET OF KCs REMAINING
- SELECTION OF TAXONOMY-WIDE ALTERNATIVES

FIG. 16

PQ - Parameterized Question

KANISTAURANT IS FAMOUS FOR IT'S CHERRY PIES.
WOULD YOU LIKE TO TRY A PIECE?

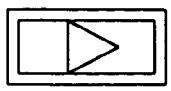

- SHORTCUT OUT OF DIALOG
- A GUESS ABOUT LIKELY USER INTENTIONS
  - FREQUENTLY ASKED
  - IMPORTANT

FIG. 17

Example: Dialog Walkthrough (continued)
"BREAKFAST"
"WE HAVE EGGS AND PANCAKES. WHAT WOULD YOU LIKE?"
"EGGS"
"SCRAMBLED, POACHED OR BENEDICT?"
"SCRAMBLED"
"HERE IS YOUR CHECK. THANKS FOR COMING"
FIG. 21

SYSTEM AND METHOD FOR PROVIDING AN INTELLIGENT MULTI-STEP DIALOG WITH A USER

This application is a continuation of U.S. application Ser. No. 09/798,964 filed on Mar. 6, 2001 which claims priority to U.S. Provisional Application No. 60/187,472 filed Mar. 6, 2000 which is incorporated herein by reference.

This application also claims priority to U.S. application Ser. No. 10/610,994 filed Jul. 1, 2003 which is a divisional of U.S. application Ser. No. 09/594,083 filed Jun. 15, 2000, now U.S. Pat. No. 6,711,585 which is incorporated herein by reference.

FIELD OF THE INVENTION

This invention relates to systems and methods for retrieving information and, more particularly, to systems and methods for providing a multi-step conversation-like interaction between a person and a computer or other device to refine and satisfy the person's request for information.

BACKGROUND

A key resource of most, if not all enterprises is knowledge. For example, in a customer service environment, customers expect prompt and correct answers to their information requests. These information requests may relate to problems with products the customer has purchased, or to questions about products they may decide to purchase in the future. In most cases, the answer to the customer's question exists somewhere within the enterprise. In other cases, the answer may have existed in the enterprise at one time, but is no longer there. The challenge is to find the best answer and provide it to the customer in a timely manner.

Typical approaches to providing support information to customers on the Internet, either provide a static structure (predefined hyperlinks) for customers to navigate to the information they need, or they provide simple "lookup" facilities for finding documents or products, such as database searches or full-text searches for keywords appearing in documents or in product descriptions. These types of approaches are typically not tailored to the customer (no personalization) and do not typically engage the customer in a multiple step interaction (no conversational dialog), wherein the information is elicited from the customer.

Other current approaches for providing support information to customers, such as case-based reasoning systems and expert systems, provide a multiple step interaction with customers, but they require the business to set up very complex "case" structures or expert-system rule sets that define the problems and their resolutions in great detail. These approaches are often brittle and it is typically very costly for the business to add new rules and cases to these systems.

Still other Web-based systems check for particular textual content without the advantage of context or domain knowledge. Consequently, they generally do not reliably and consistently return the desired information. This is at least partly due to the fact that language is not only inherently ambiguous, but also because it is susceptible to expressing a single concept any number of ways using numerous and unrelated words and/or phrases. By simply searching for specific key words, prior art search engines fail to identify other alternatives that may also be helpful.

Consequently, there is a strong need in the art for an improved method and apparatus for retrieving relevant information from large knowledge bases. There is also a need for providing this capability to relatively unsophisticated users.

SUMMARY OF THE INVENTION

The present invention satisfies the above-described need by providing a system and method for efficiently retrieving information from a large knowledge base. More specifically, the present invention uses a fairly simple set of knowledge structures to represent the domain of problems to be discussed with the customers. New documents describing problem resolutions, product descriptions, etc., can be either manually or automatically placed into these knowledge structures. Users' interests, backgrounds, etc., can also be represented using these same structures. Once the knowledge structure is populated, businesses can write fairly simple navigation rules that allow the invention to engage customers in a rich, personalized dialog.

The present invention supports a model of interaction between a machine and a human being that closely models the way people interact with each other. It allows the user to begin with an incomplete problem description and elicits the unstated elements of the description—which the user may not know at the beginning of the interaction, or may not know are important—asking only questions that are relevant to the problem description stated so far, given the system's knowledge of the problem domain; without requiring the user to answer questions one at a time, or to answer all of the questions posed; and without imposing unnecessary restrictions on the order in which questions are posed to the user. The present invention allows the dialog designer to model the way an expert elicits information, giving a human feel to the dialog and a better customer experience.

In one embodiment, the present invention is an application program running on a server accessed via the worldwide web or other data network using standard Internet protocols, a web browser and web server software. In operation, users start a dialog by directing their web browser to a designated web page. This web page asks the user some initial questions that are then passed to a dialog engine. The dialog engine then applies its methods and algorithms to a knowledge map, using dialog control information and the user's responses to provide feedback to the user. The feedback may include follow-up questions, relevant documents, and instructions to the user (e.g., instructions to contact a human customer service representative). This dialog engine response is rendered as a web page and returned to the user's web browser. The user can then respond further to the follow-up questions he or she is presented and the cycle repeats.

The invention can be implemented so that it can interact with customers through a wide variety of communication channels including the Internet, wireless devices (e.g., telephone, pager, etc.), handheld devices such as a personal data assistant (PDA), email, and via a telephone where the automated system is delivered using an interactive voice response (IVR) and/or speech-recognition system.

Additional features and advantages of the invention will be set forth in the description which follows and, in part, will be apparent from the description, or may be learned by practice of the invention. The objectives and other advantages of the invention will be realized and attained by the methods, systems, and apparatus particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings

FIG. 13 is a chart illustrating the different categories of follow-up questions in accordance with an embodiment of the present invention;

FIG. 15 is a chart illustrating a text question in accordance with an embodiment of the present invention;

FIG. 16 is a chart illustrating a document driven question in accordance with an embodiment of the present invention;

FIG. 17 is a chart illustrating a parameterized question in accordance with an embodiment of the present invention;

FIGS. 19-21 are drawings illustrating a typical dialog.

DETAILED DESCRIPTION

Figure 1:
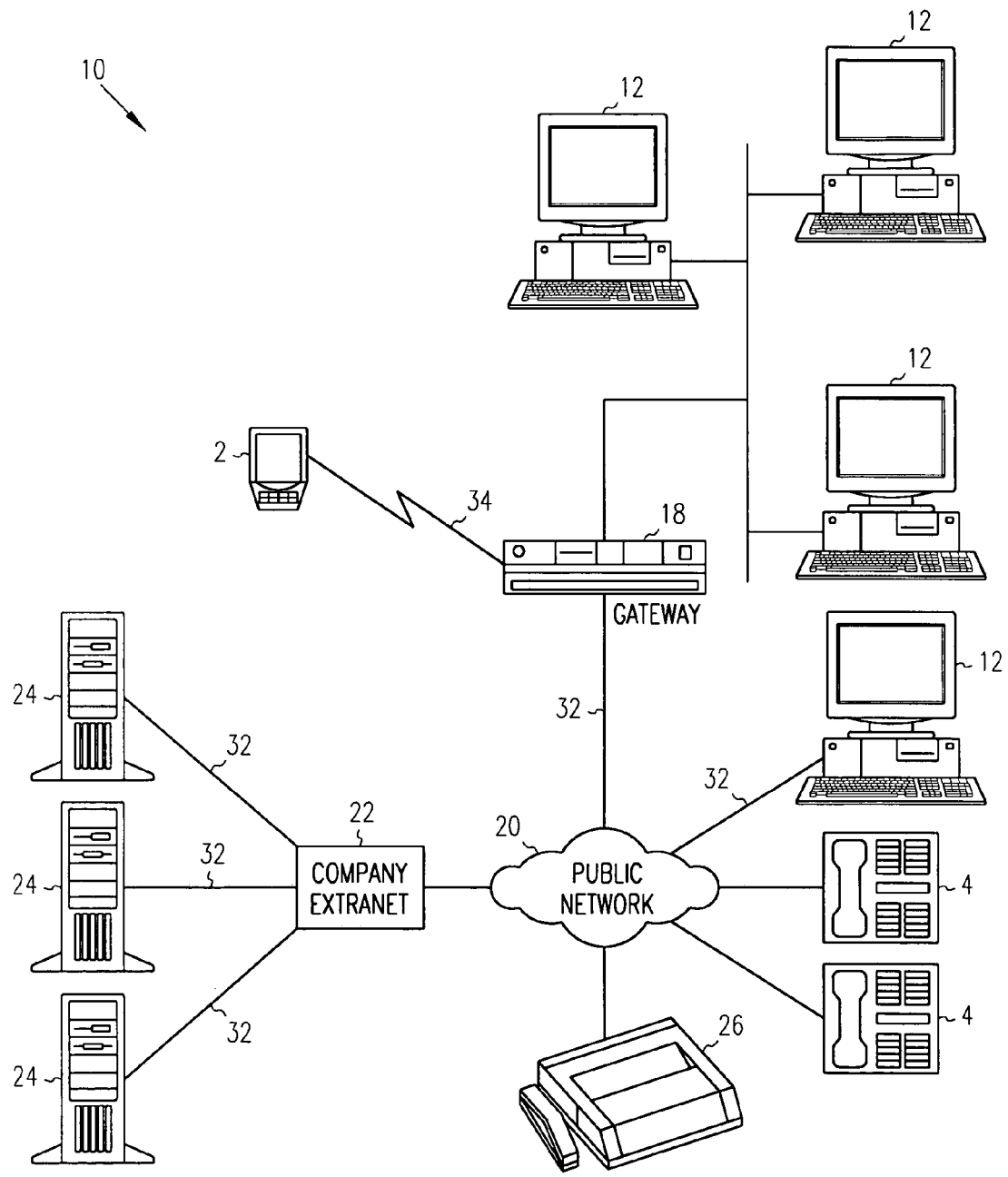
FIG. 1 is a block diagram of a network including an arrangement constructed in accordance with the subject invention for providing a multi-step interactive dialog over a network.

In the following detailed description of one embodiment, reference is made to the accompanying drawings that form a part thereof and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

A system in accordance with the present invention is directed to a system (generically, an "e-service portal") and method for the delivery of information resources including electronic content (documents, online communities, software applications, etc.) and physical sources (experts within the company, other customers, etc.) to end-users. In order to further convey a complete understanding of the present system, the following overview is provided:

Overview

The purpose of a dialog engine is to facilitate the following in an electronic interaction between a human being and a machine (computer or other device including for example a telephone or personal data assistant):

a.) Find and deliver an appropriate set of knowledge containers (as defined in previous filings) to the human;

b.) Find and route the human to an appropriate web service (see definitions) or human expert;

c.) Encapsulate the interaction between a human and a machine in the form of a meta-data representation relating to a knowledge map (knowledge session); and d.) Deliver the knowledge session to other applications via API, XML or any other form.

The dialog engine of the present invention is designed to construct a "knowledge session" in the context of a knowledge map (as described in the commonly assigned, co-pending U.S. patent application Ser. No. 09/594,083, entitled "System and Method for Implementing a Knowledge Management System," which has previously been incorporated by reference).

A knowledge session is a representation of a user's situation or scenario in the context of a knowledge map. A knowledge session includes text elicited from the user and a collection of tags (as described in application Ser. No. 09/594,083) that each represent a link to a concept node within the knowledge map and a "weight" indicating the strength of that link.

The dialog engine is a machine for knowledge session management defined by at least the following operations: the ability to accept inputs, the ability to interface to inference engines, the ability to construct interactions, and the ability to send sessions to other software.

The dialog engine of the present invention is defined by:

1.) The dialog engine creates the knowledge session through a plurality of input types.

2.) The dialog engine acts on these input types by interacting with a plurality of inference engines.

3.) The dialog engine refines the session via a plurality of interaction forms.

The dialog engine may output sessions to search engines (or other applications) in the form of a markup language based representation (e.g., XML or HTML, etc.) of the knowledge session.

Input Types:

The dialog engine builds a knowledge session using a plurality of input, such as the following:

The context of a user's entry into the present system (entry context);

The autocontextualization (classification into a knowledge map, as described in the commonly assigned, co-pending U.S. patent application Ser. No. 09/594,083, entitled "System and Method for Implementing a Knowledge Management System," which has previously been incorporated by reference). of a natural language text ("a question") entered by the user (question context);

The customer data or profile maintained about a user (user context);

The responses by the user to queries posed by the dialog engine (dialog context);

Choices made in respect to the common ground (see definitions) (common ground context);

The choices/actions made by the user during the dialog (such as selecting a document) (interaction context).

User Entry:

The dialog engine can utilize the context of a user's "entry" into the present system environment in the form of:
  a.) The link the user traversed to enter the system;
  b.) An XML (or other markup) packet describing the user's situation (a form, a meta-data collection);
  c.) A blob of text describing the users situation which can be autocontextualized.

Each of these inputs is mapped to the knowledge map to create tags.

Natural Language:

The dialog engine can elicit from the user a statement of the user's problem, issue, or request in the form of keywords or natural language. This is the user's "question". This natural language is converted into a set of tags using the autocontextualization process.

Profile
  User "profiles" can come in the form of:
  1.) a structured data record obtained from a customer relationship management (CRM) or customer database;
  2.) a packet containing meta-data in the form of tags;
  3.) a user knowledge container (as described in co-pending U.S. patent application Ser. No. 09/594,083).

Each of these inputs is mapped to the knowledge map to create tags.

Dialog Response

The dialog engine interacts with users to create and refine the knowledge session tags. The dialog engine utilizes a range of interaction forms (described below) to elicit additional information from the user.

System Interactions

The user makes choices and selections during the dialog interaction not specifically associated with the dialog itself. These selections include:
  a.) Browser interactions (e.g. choosing the back button);
  b.) Interactions with documents (e.g. choosing to view a knowledge container); and
  c.) Interactions with GUI elements.

Each of these inputs can be translated into inferences in relationship to the knowledge map.

Inference Engine Interaction:

Dialog Engine Drivers

The dialog engine can be driven by one or more "inference engines" (e.g., a standard rules engine, a standard classification engine, and an autocontextualization engine.)

The dialog engine can support some or all of the following interaction forms:
  1.) Popular or parameterized queries (PQ)
  2.) Drill down queries (DDQ) or clarifying queries (CQ)
  3.) Discriminating queries (DQ)
  4.) Disambiguating queries (DAQs)

These four interaction forms represent the set of logical mechanisms for taking an initial session state as defined by 1 or more of the 3 initial forms of context. These initial forms are the entry context, the question context and the user context. Interaction forms are designed to build dialog context from the combination of the three initial contexts (as bound together in the knowledge session state). The goal of the interaction forms is to support a logical and intuitive way to enable the human (user) to tell the machine (dialog engine) "more", in order to assist the machine in expanding and refining the session state so as to better perform the functions of the dialog engine (see Overview).

The four logical interaction forms are:

Popular or parameterized queries (PQs): One obvious response to a user question is to determine whether it is, in fact, analogous/equivalent to a question for which there is a well-known answer. In human conversation, this is captured by: "So, are you really asking, X?". X is a restatement of the question in terms understood by the responder. The responder asks the query in this way to ensure that a possible known "answer" is really relevant (that is, the user is actually asking the question which is the predicate of the answer).

In the dialog engine, parameterized queries (PQs) are specific "pre-created" queries that are played to the user when the session state matches the conditions necessary for the parameterized query (PQ) to be appropriate. For example, suppose that the parameterized query (PQ) (PQ: 1245 containing query: "Are you receiving an error message #101 when installing for the first time?", options: YES/NO and answer: KC EXTERNALID:001) is mapped within the knowledge map to the activity taxonomy: First time install and to the symptom taxonomy: error message. If the user asks the questions "I'm getting an error when installing the software" and this autocontextualizes to the activity taxonomy: first time install, symptom taxonomy: error message, object taxonomy: software, then the dialog engine will play the parameterized query (PQ) to the user. If the user answers Yes, the answer will be displayed. If the user answers no, the answer will not be displayed. The user's answer changes the session state by emphasizing the importance of the tags mapped to the parameterized query (PQ).

Drill down queries (DDQ) or clarifying queries (CQ): The drill down query (DDQ) interaction form utilizes the information contained in the knowledge map to structure a query. In its simplest form, the goal of the drill down query (DDQ) is to utilize the "shape" of a taxonomy to obtain additional information. If a user asks "How do I install Windows" and the dialog engine recognizes that Windows is a reference to a concept node called the Windows OS and the Windows OS concept has taxonomic children called Windows 95, Windows 98 and Windows 2000, then the dialog engine can/will ask:
  Are you asking about:
  Windows 95
  Windows 98, or
  Windows 2000?

The user selection will change the session state by refining the meta-tag Windows to the meta-tag Window 95 (or whatever is chosen by the user). In short, a drill down query (DDQ) utilizes the knowledge contained in the knowledge map (and typically within one taxonomy or knowledge container that is a constituent of the knowledge map) to elicit a finer grained understanding of the session.

A drill down query (DDQ) may utilize one or more of the following knowledge map elements to structure the options associated with the drill down query (DDQ):
  a.) Parent-child relationship within a taxonomy;
  b.) Sibling relationship within a taxonomy;
  c.) Pattern similarity across concept node evidence vectors; and
  d.) The type of relationship link connecting concept nodes.

A discriminating query (DQ) is designed to discriminate between the knowledge containers remaining in the search space. This query emanates from the meta-data associated with the individual knowledge containers (KCs) in the search space. The Dialog engine looks to see if it can discriminate between knowledge containers (KCs) based on asking the user to choose between alternative concepts relevant to the knowledge containers (KCs) still "alive" in the search space given the current session state. So, if the knowledge containers (KCs) in the search space have different tags within the same taxonomy, the dialog engine might ask the user to choose which of these competing concepts was actually relevant. For example, if some knowledge containers (KCs) are tagged to "first-time installation", others to "re-installation" and still others to the activity "deactivation", the query would ask the user to discriminate interest in these competing concepts. The effect of the discriminating query (DQ) is to simultaneously eliminate tags from the search space while strengthening others.

Disambiguating queries (DAQs) use the mapping between the user's text and tags derived from it and\or relationships between tags in the knowledge session to identify ambiguity in the session state associated with the user question or between the various forms of context collection. Disambiguating queries (DAQs) are queries formulated to highlight this ambiguity and to ask the user to disambiguate by making a clear choice between the potential interpretations.

Several forms of disambiguating queries (DAQs) are part of the dialog engine:

Evidence vector disambiguating queries (DAQs): Identified by a "term" (as defined in co-pending U.S. patent application Ser. No. 09/594,083, entitled "System and Method for Implementing a Knowledge Management System,") that is evidence for multiple concept nodes. For example "ATM" is evidence for the concept asynchronous tranfer mode and automatic teller machine.

Knowledge map disambiguating queries (DAQs): Identified by tags that are ambiguous according to the semantics of relationships within the knowledge map such as sharing a common ancestor whose descendants should be exclusive.

Text disambiguating queries (DAQs): Identified by characteristics of the user's text, such as misspellings or ambiguity of words in the text (as defined by an external machine-readable dictionary, thesaurus, or lexicon, e.g., WordNet), or by a lack of information in the autocontextualization engine about words in the text.

Combination disambiguating queries (DAQs): disambiguating queries (DAQs) that use two or more of the above sources of information about ambiguity.

| Interaction Form | Emanates from: | Session Implication | Sample Query Text | Suggested GUI Form |
|---|---|---|---|---|
| PQ | Session State | Focuses on key tags | "Are you asking X?" | YES/NO Radio Button |

-continued

| Interaction Form | Emanates from: | Session Implication | Sample Query Text: | Suggested GUI Form |
|---|---|---|---|---|
| DDQ | Knowledge Map | Refines a tag | "Which of the following types of X are you interested in?" | List Box |
| DQ | Search Space | Eliminates tags, Focuses on tags | "Select any of the following subjects relevant to your question:" | Check Boxes |
| DAQ | Evidence Vectors | Eliminates contradictory tags | "Is your question more about X or Y?" | Radio Button |

Query Graphical User Interface (GUI) Forms:

The dialog engine can utilize any or all of the following question forms, as appropriate, as the graphical user interface (GUI) for user interaction:
  Open ended questions: text box
  Multiple choice questions: list box
  Open+choice: combo box
  Option questions: radio button
  Multiple option questions: check box The graphical user interface (GUI) presentation of a query to a user is independent of the interaction form. That is, an interaction form may, in different instances, utilize a different graphical user interface (GUI) form. Graphical user interface (GUI) forms are simply the set of presentation options provided by the computer environment or operating system. Unlike the interaction form, they are external to the dialog engine.

Outputs

The dialog engine outputs session states in one or more formats. These formats include:
  An extensible markup language (XML) (or other markup language) representation;
  A dialog record (click stream log); and
  A web form.

The session state output contains some or all of the following:
  Tag records: concept-node name, weight, context type (as discussed above)
  Question string: user input text;
  Dialog action records: dialog action type, sequence ID, knowledge container (KC) external ID;
  Search space record: knowledge container (KC) external ID, weight, rank; and
  Search query string: text formulated by search engine to produce the search space.

Interaction with Search and Retrieval Engines and Web Services

The dialog engine is designed to work with any prior art search/retrieval engines to produce a search space. The search space is the set of specific knowledge containers "in play" based on the session state. The search space is a function of the session state, but a given search/retrieval engine will manufacture a different search space based on its specific algorithm for translating the search space into a "query string" and its own algorithm for retrieving a knowledge container (KC) or document from an index based on a query string.

The dialog engine is designed to interact with web services. This interaction can be thin or thick based on support for a variety of interface methods such as:

URL: PQ;
API;
Dynamic URL: GPQ; and
XML: WebForm.

The dialog engine's competence to interact with web services enables it to guide people to the full range of web-enabled resources.

Internal Workings:

Control Language

The dialog engine recognizes and processes any of a plurality of control languages (e.g., Kanisa Taxonomy (KTX) control language). A Kanisa Taxonomy (KTX) Language Manual (Version 2) (which is hereby incorporated by reference) describes all of the features, syntax and limitations of this control language.

Variable Termination

The dialog engine terminates its interaction with the user based on a variety of conditions. For example:

a.) Exhaustion of goals defined by the control language;
b.) Exhaustion of goals emanating from the knowledge map;
c.) Reduction of the search space below a size threshold associated with interaction termination;
d.) User opts out; and
e.) Web session times out.

No Answers/Not Relevant Answers

The dialog engine processes user inputs to the queries not only in the form of positive selections, but also in the form of implicit or negative selections. These include situations where the user chooses to skip the question, or when the user chooses options such as "None of the Above" or "Irrelevant".

Definitions:

User: A person creating a session with the dialog engine.

Knowledge container: A combination of content and meta-data in the form of tags to a knowledge map.

Web service: A software application accessible by universal resource locator (URL) or extensive markup language (XML).

Common ground: A representation of a knowledge session that may be displayed to a user to show how the dialog engine interprets the information elicited from the user or inferred during dialog processing and that may be modified by the user in order to correct or change the dialog engine's interpretation.

Knowledge map: A structured representation (model) of the real world encapsulated in a set of classifications and linked by relationships or rules.

Interaction form: A standard mechanism for eliciting additional information from an application user by automatically generating a query.

Knowledge session: An interaction between a human and a dialog engine as mediated through a knowledge map.

Knowledge session state (also known as "dialog state"): The aggregate set of meta-data (tags), text and dialog information that encapsulates the known facts about a knowledge session.

Question: The natural language text communicated by a user to the dialog engine.

Query: An interaction form combined with a graphical user interface (GUI) representation on a screen sent by the dialog engine to the user.

Search space: The set of knowledge containers passed to the dialog engine by a search/retrieval engine as potentially useful given the session state.

Query string: The query string used by a search engine to retrieve knowledge containers or document records.

Turning now to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the figures, corresponding reference characters refer to corresponding elements, wherever possible. Like many systems of knowledge representation, the present invention represents and stores both the individual instances of information and the concepts that can be used to organize these instances (i.e., single concepts that can be associated with multiple instances).

Referring now to the drawings, FIG. 1 illustrates a network 10 for implementing the subject invention. As shown in FIG. 1, network 10 is comprised of thin client computing devices 2 (PDAs and cellular telephones), analog or digital telephones 4, desktop or laptop client computing devices 12, facsimile machines 16, gateways 18, extranets 22 and servers 24 coupled to a public network 20. Digital telephones 4, client computing devices 12, facsimile machines 16, gateways 18, extranets 22 and servers 24 are coupled to public network 20 via a conventional interface 32. As shown in FIG. 1, thin client computing devices 2 are coupled to gateway 18 via a wireless interface 34. Each telephone 4 is a conventional analog or digital telephone that communicates with other analog and digital telephones over a public-switched telephone network (PSTN). Client computing devices 12 may be directly connected to public network 20, or they may be coupled to the public network 20 via gateway 18. Gateway 18 is a file server that may be connected to other computers on the public network 20. Company extranet 22 is a smaller private network that may be separated from other computers on public network by a firewall. Coupled to company extranet 22 are a plurality of server computers 24.

In one embodiment of the present invention, the public network 20 is the Internet. Thus, before describing the operation of the system of the present invention (described below in connection with FIG. 18), it would be helpful to briefly discuss the basic functionality of the Internet as it relates to the system of the present invention. The Internet is well known in the art as a worldwide data network of various computer systems and other data networks of varying size. Connection to the Internet may be accomplished via standard phone lines or via dedicated high-throughput communications lines such as Integrated Services Digital Network (ISDN) and T1. The functionality of the Internet as a data communication medium is well known and encompasses a broad range of applications. One such application is the World Wide Web (WWW). The world wide web (WWW) is a subset of the Internet which allows computers connected to the Internet to access interactive programs called web sites located on other Internet-connected computers by entering a unique "address" associated with a particular web site. Because of their interactive features, web sites are ideal for both distributing and gathering information. Most importantly, a particular computer's web site may be linked to and may control other programs stored on the same or on another computer connected to the Internet. For example, a web site describing a company's products and services may be stored in a company extranet 22 and accessed via the public network 20 (in this case, the Internet) by a customer using the client computing device (2 and 12) or telephone 4.

The customer may view information about the company provided by the web site and may also use the web site's interactive features to place a request for more information from the company or for technical support for the company's product. The web site may also cause another program stored in the company extranet 22 to select other programs in response to the customer's request. This, and other features of the Internet make it preferable as the public network 20 in accordance with the system of the present invention.

Figure 2:
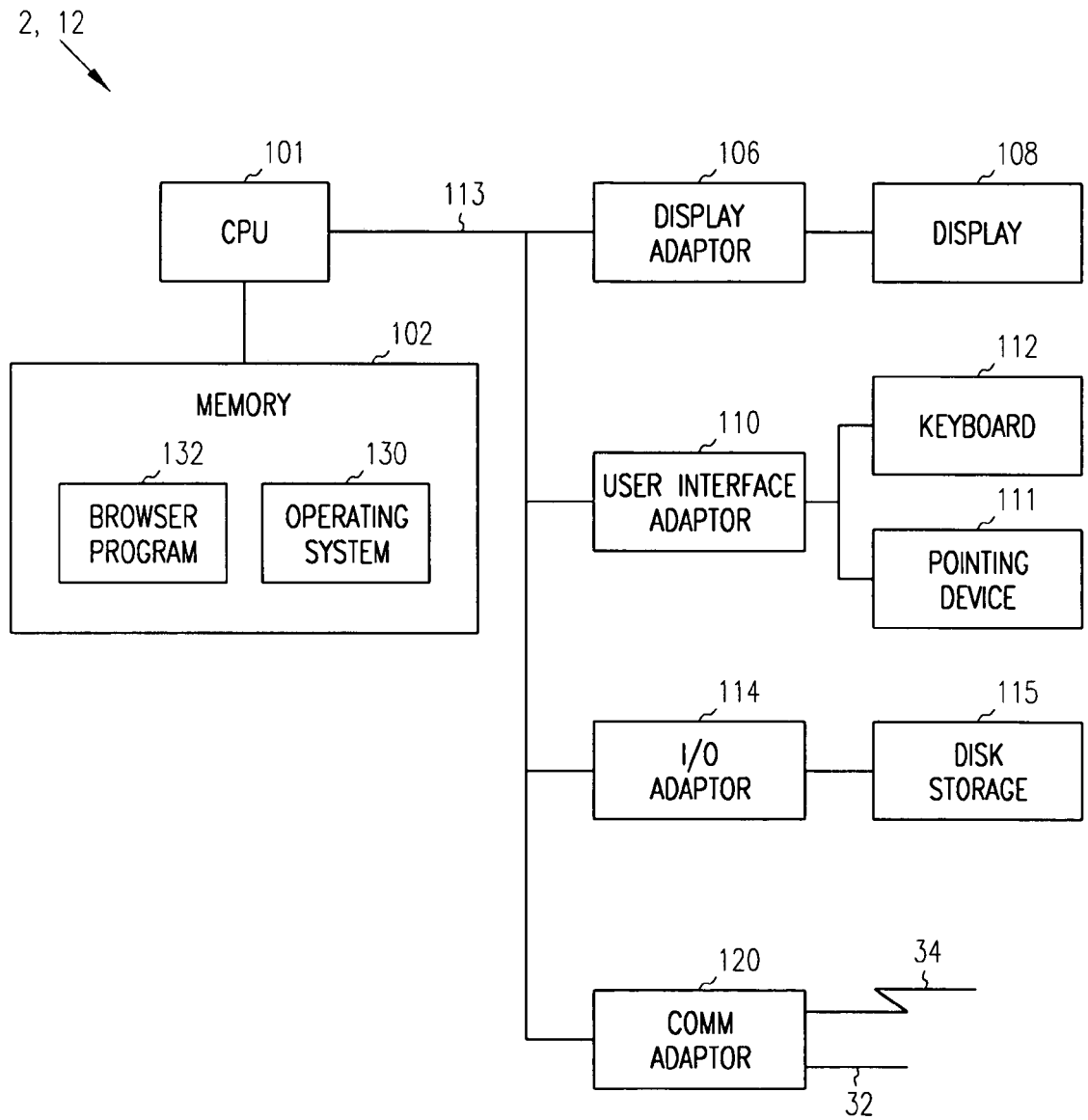
FIG. 2 is a more detailed block diagram of a client computing device of FIG. 1.

As shown in FIG. 2, client computing device (2 and 12) is further comprised of a central processor unit (CPU) 101, a memory 102, a display adapter 106, a display 108, a user interface (UI) adapter 110, a pointing device 111, a keyboard 112, an input/output (IO) adapter 114, a disk storage unit 115, and a communications adapter 120. Client computing devices (2 and 12) enable a customer to access company extranet 22 via the public network 20 in order to request information about a company's products or services or receive assistance from the company's customer support representatives located at dialog engine server 24. Client computing device 12 is preferably connected to public network 20 via network interface cable 32 (e.g., a standard phone line or a high throughput telecommunication medium such as an ISDN line or a T1 line) for enabling bidirectional data communications with other computer systems connected to public network 20. Thin client computing device 2 is preferably connected to public network 20 via wireless data link 34 and gateway 18. Thin client computing devices 2, as is commonly known by those skilled in the art, usually consist of less capable processors and smaller memories than desktop and laptop clients. Memory 102 includes an operating system 130 for operating the device and a browser program 132 for rendering and displaying content. As shown, the various components of each client device (2 and 12) communicate through a system bus 113 or similar architecture. FIG. 2 also shows that communications adaptor 120 is coupled to network interface cable 32 (or wireless data link 34) for providing connectivity between client computer (2 and 12) and public network 20. There may be other components as well, but these are not shown to facilitate description of the unique aspects of this embodiment of the invention. The hardware arrangement of this computer, as well as the other computers discussed in this specification is intentionally shown as general and is meant to represent a broad variety of architectures, which depend on the particular computing device used.

Figure 3:
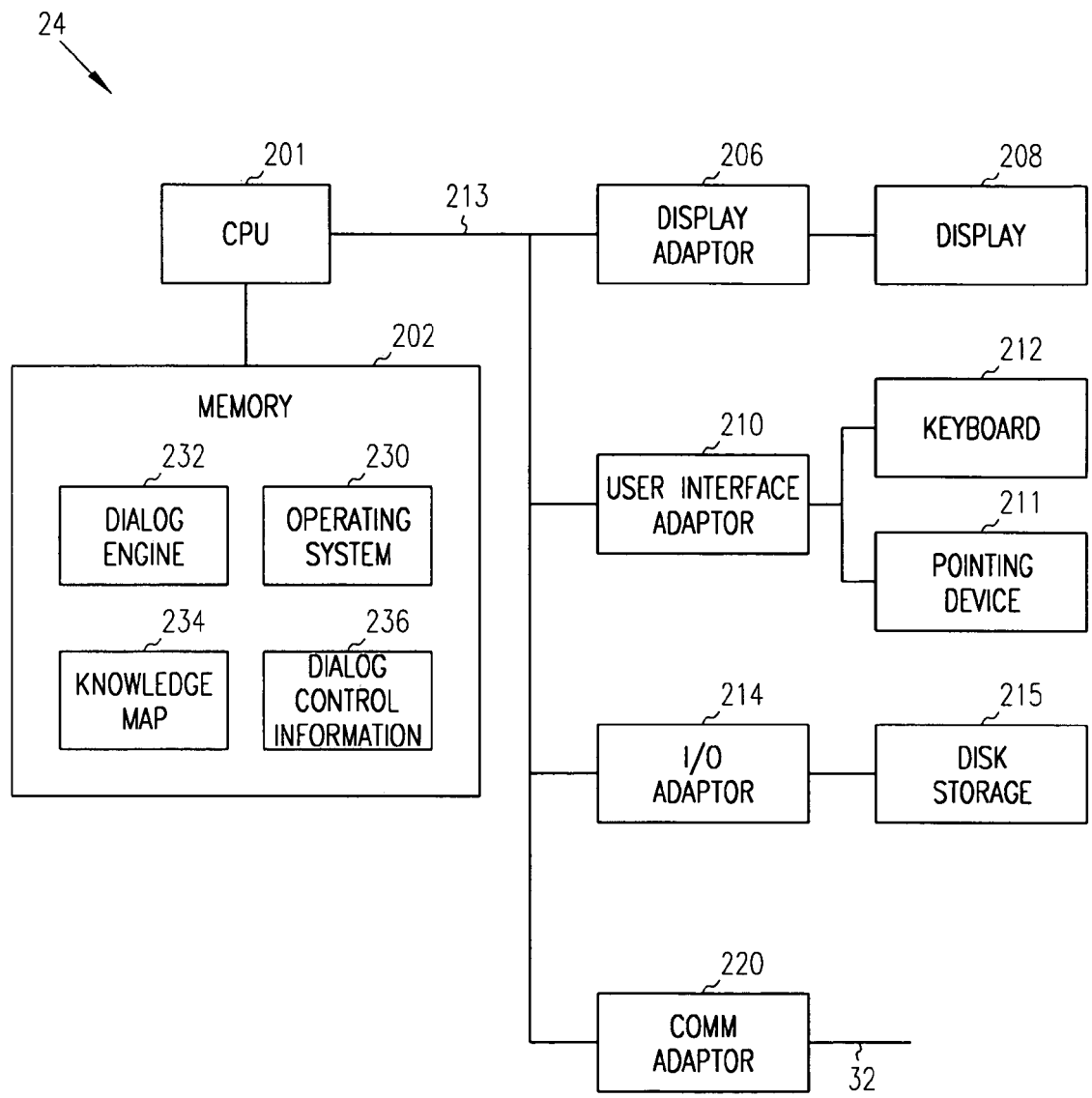
FIG. 3 is a more detailed block diagram of a dialog engine server of FIG. 1.

FIG. 3 shows a detailed diagram of a dialog engine server 24 in accordance with one embodiment of the present invention. As shown, dialog engine server 24 is comprised of a CPU 201, a display adapter 206, a display 208, a UI adapter 210, a pointing device 211, a keyboard 212, an IO adapter 214, a disk storage unit 215, a communications adapter 220 and a network interface cable 32. Dialog engine server 24 also has a memory 202 for storing an operating system 230 which controls its operation, dialog engine 232 for retrieving content, a knowledge map 234, and dialog control information 236. Dialog engine 232 uses a knowledge map 234 and dialog control information 236, to produce dialogs with users in the domain of knowledge map 234. One or more people called "dialog designers" create the knowledge map, including user profile information documents, and the dialog control information that is loaded into memory 202 of server 24. Dialog designers also use dialog engine 232 to set goals, create triggers (rules), stored questions (PQs), and user preferences that retrieve information from knowledge map 10 and control the end-user's experience. After the dialog designers have created the knowledge map and dialog control information, and loaded it into memory 202, dialog engine 232 is ready to have dialogs with users about the domain of the knowledge map.

While FIG. 3 depicts dialog engine server 24 as a single computer, those skilled in the art will appreciate that it may also be a distributed computer system, such as a local area network (LAN), with the capabilities described above. As in the case of client computing devices 12, dialog engine server 24 is preferably connected to public network 20 via a high throughput telecommunication medium, such as an ISDN line or T1 line for enabling bi-directional data communication with other computer systems also connected to public network 20. A connection to public network 20 via a high throughput telecommunication medium is particularly advantageous for dialog engine server 24 because it provides sufficient bandwidth to handle a large number of accesses by other computer systems concurrently connected to dialog engine server 24 via the company extranet 22 and public network 20, such as client computing device 12.

In the above system, the interaction between computers is achieved using a "client-server" software architecture in which a client program contacts a dialog engine server 24 through any software communication mechanism or protocol. In another embodiment, dialog engine 232 and the user interface program 132 can be the same program. A similar type of interaction can be achieved using a portable device such as a wireless application protocol (WAP) cellular telephone, Palm Pilot, or alphanumeric pager as the client in which the user views and responds to information that comes from a dialog engine server.

In some embodiments, a similar type of interaction can be achieved vocally via an interactive voice response (IVR) type of system. In these embodiments, the user speaks their requests and responses into telephone 4 or other microphone and may also provide other input by pressing buttons (e.g. buttons on the telephone's keypad). The user's spoken responses are passed to a voice recognition system, which turns the responses into data that dialog engine 232 can process. The dialog engine 232 response is passed to a text-to-speech system that turns it into a vocal response to the user.

In yet another embodiment, the data format that is used to encode "requests" to the dialog engine (whether to start a new dialog or to pass user responses back to dialog engine) and the data format used to encode the dialog engine's responses, is in extensible markup language (XML) format. XML is a standard data format syntax adopted by the World Wide Web Consortium (W3C). Commonly available software exists to take XML-encoded data and a "style sheet" encoded in XSL (extensible stylesheet language) and combine them to render HTML (hypertext markup language), which is the display format that web browser software can display. The advantage of this approach is that for the dialog designers to create new "looks" for users using the dialog engine via a web browser, all that is required is changing the XSL stylesheet to produce the desired HTML.

It should be appreciated from the schematic overview illustrated by FIG. 1 and the detailed schematics of FIGS. 2 and 3 that the present invention may be employed in a distributed computer system environment which has internal, external and intranet networks collectively represented in the schematic overview by public network 20 to connect: PDAs 2, telephones 4, clients 12, and gateways 18 to world wide web servers and dialog engine servers 24 within the system in which the present invention is situated.

Thus far, this description has focused on the design and architecture of an exemplary network 10 for implementing the subject invention. The next portion of the description will describe the process for resolving an inquiry initiated by a user at a client workstation on network 10. More specifically, when a user at one of the client devices (PDAs 2, telephones 4, clients 12) poses a question to dialog engine server 24, a multi-step interactive dialog as explained below, occurs between the user and dialog engine 232.

Figure 4:
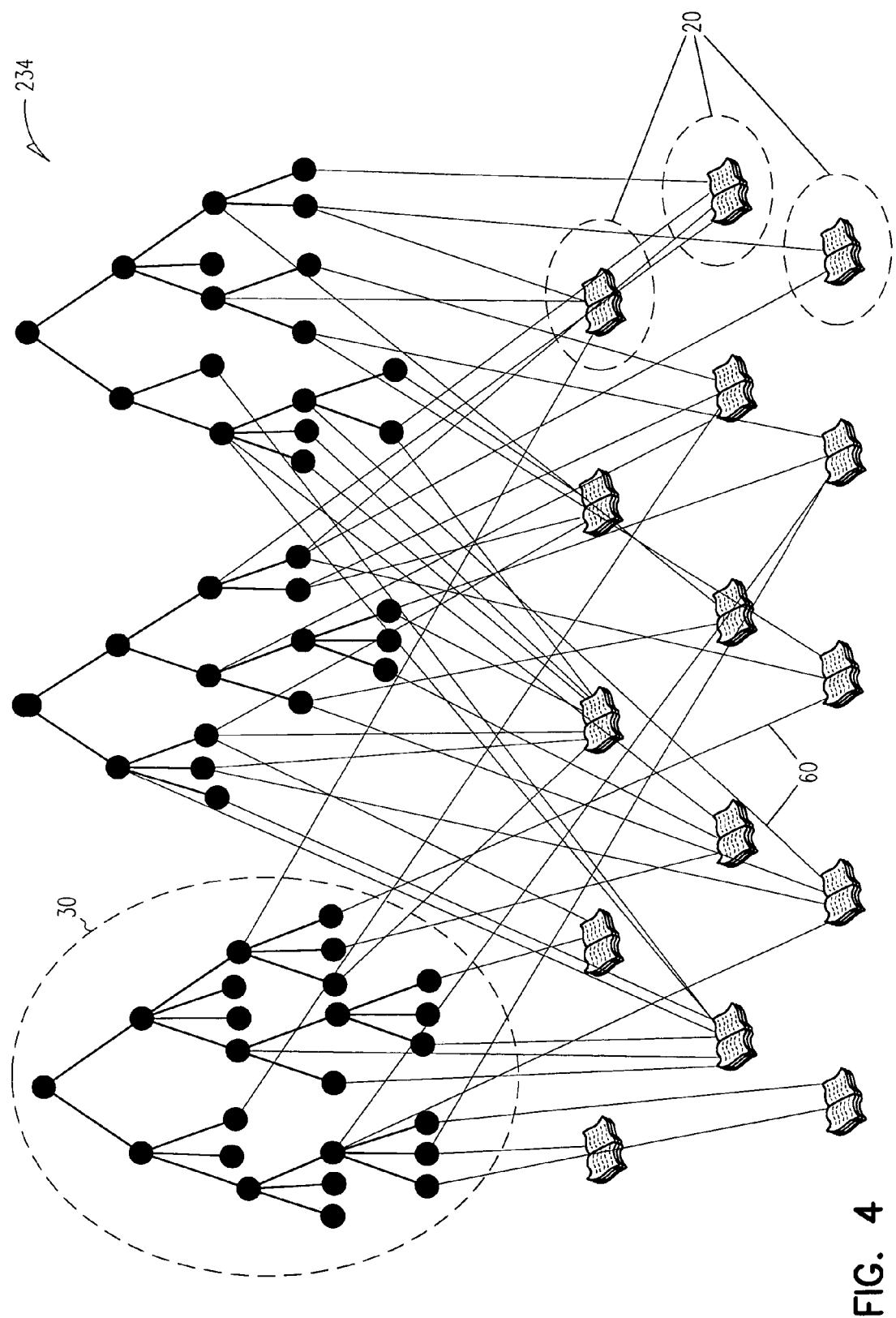
FIG. 4 is drawing illustrating the relationship between knowledge containers, taxonomies and taxonomy tags in accordance with an embodiment of the present invention.

The two main components for implementing a dialog with a user are a dialog engine and a knowledge map. To resolve the user's question, dialog engine 232 interprets the question, poses other questions to the user and then interprets the user's answers to eliminate irrelevant concept nodes and traverse a knowledge map as it focuses in on an answer to the user's question. FIG. 4 depicts a knowledge map 234 for organizing various dimensions of information. As shown in FIG. 4, knowledge map 234 is comprised of knowledge containers 20, taxonomies 30 and taxonomy tags 60. Knowledge containers 20 are individual instances of information that may be associated with one or more taxonomies 30 through the use of one or more taxonomy tags 60.

Figure 5:
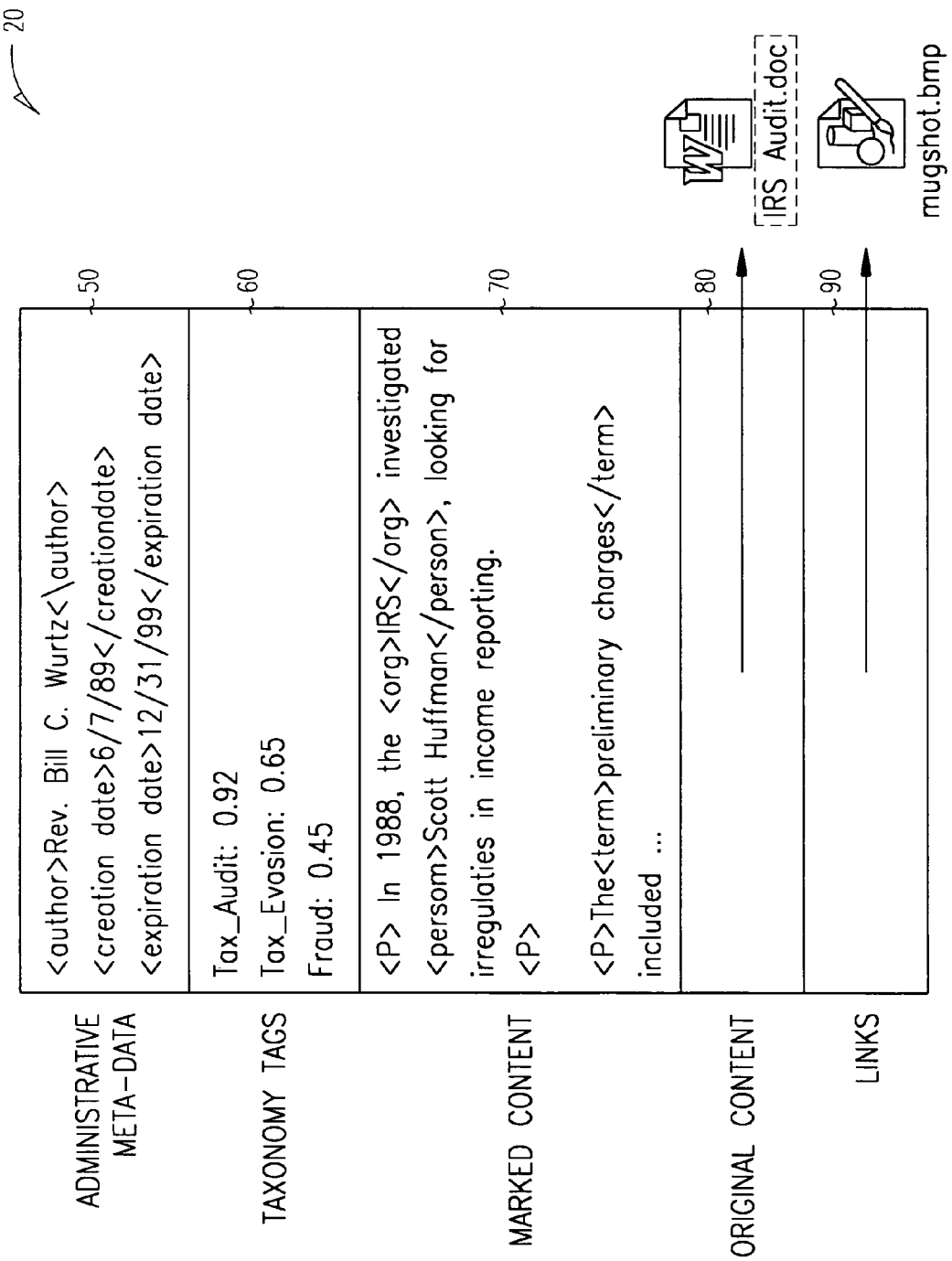
FIG. 5 shows one embodiment of knowledge containers that include five main components.

As shown in FIG. 5, each knowledge container is comprised of administrative meta-data 50, context tags 60, marked content 70, original content 80 and links 90. Administrative meta-data 50 is a set of structured fields that hold typed information about the knowledge container, including who created it, who last modified it, for whom it was created, its title, a short "synopsis" or description, a uniform resource locator (URL) for reaching the original version of the content (if applicable), the name of the publication the content appeared in (if applicable), etc. The knowledge container 20 contains the original electronic form of the original content 80 (perhaps a Microsoft Word document, a portable document format (PDF) file, an HTML page, a pointer to it, or both). This allows the knowledge container 20 to be displayed to the end user in its complete and original form if desired. In some embodiments, the list of administrative meta-data attributes is extensible, so each different enterprise that deploys the system may add fields that it desires and/or needs.

Context tags or taxonomy tags 60 represent a multidimensional classification of the knowledge container against a knowledge map, as depicted in FIG. 4. Such a classification puts the knowledge container 20 in context within a knowledge domain. Each taxonomy tag 60 includes the name or other unique identifier of a concept node within a taxonomy 30 optionally followed by a number, typically between 0 and 1, which indicates the knowledge container's strength of association with that concept node. The taxonomy tag 60 also includes an attribution (not shown) which records whether the tag was created by a person, or automatically by the system using autocontextualization (as described in the commonly assigned, co-pending U.S. patent application Ser. No. 09/594,083, entitled "System and Method for Implementing a Knowledge Management System," which has previously been incorporated by reference). There is no restriction on the number of taxonomies to which a knowledge container may be tagged, or the number of concept nodes within a taxonomy to which the knowledge container is tagged.

Figure 6:
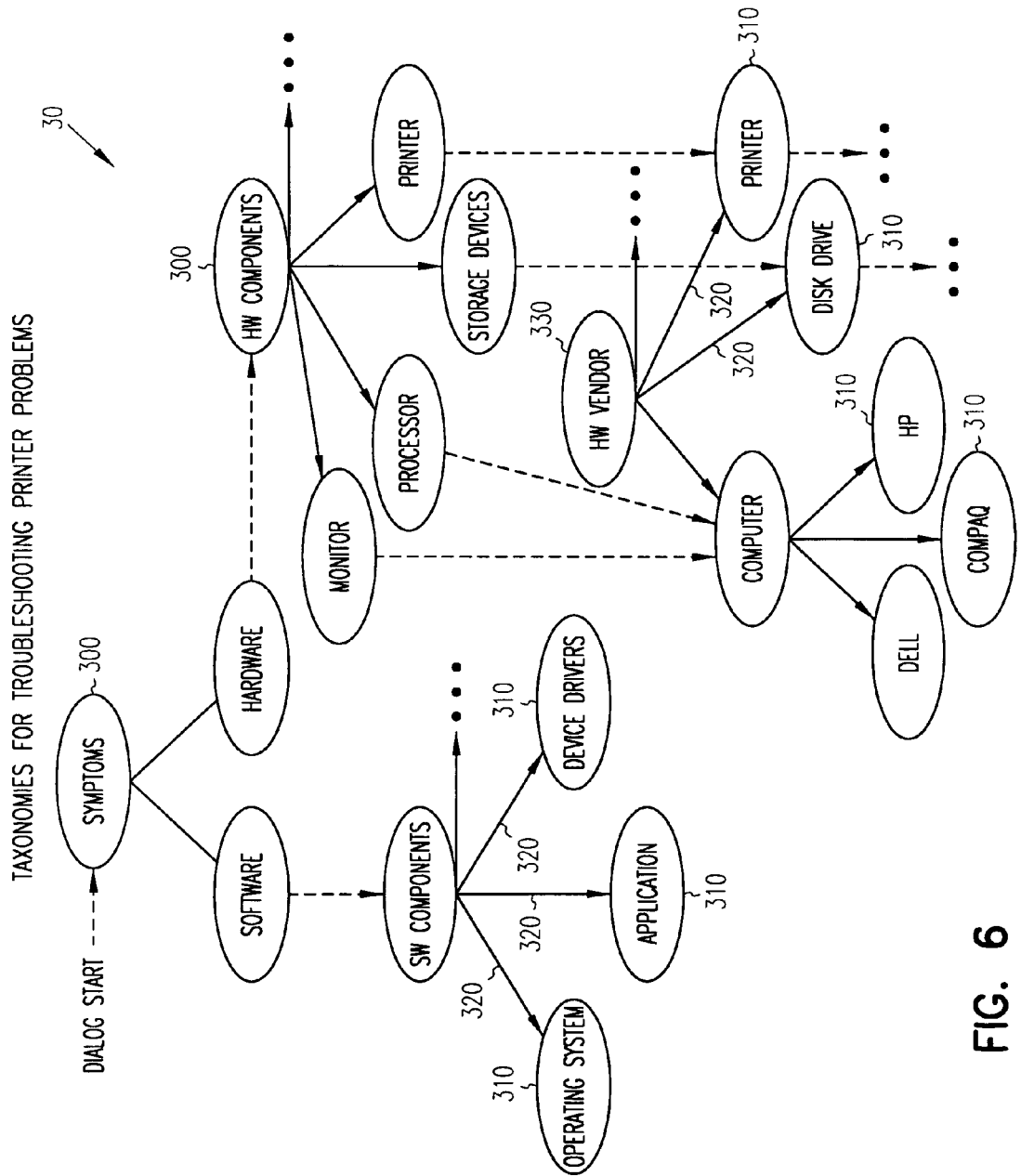
FIG. 6 is a drawing illustrating taxonomies for troubleshooting printer problems.

As stated earlier, knowledge containers are merely instances of information resources. Organizing these instances into comprehensive representations of information is accomplished through the use of taxonomies 30. An example of a taxonomy that details various hardware and software components and vendors is shown in FIG. 6. As shown, taxonomy 30 consists of a plurality of root nodes 300, a plurality of concept nodes 310 coupled together by a plurality of edges 320. Each node 300, 310 in a taxonomy expresses a "concept," or a classification to which content and resources can be assigned. The set of nodes 300, 310 for each taxonomy is created to model the taxonomy's area of concern at an appropriate level for distinguishing among the correct knowledge containers to return: neither too coarse a representation which fails to differentiate among many knowledge containers, nor too granular a representation which models more distinctions than really exist among available knowledge containers. Consequently, node 300, 310 may have zero or more children. Node 300, 310 may also contain references or taxonomy tags 60 to the knowledge containers 20 that are classified to it. These references may be accessible either from the knowledge containers they classify (in which case it can be used to identify the concept node the knowledge container is classified to) or from the concept node to which the knowledge container is classified (in which case it can be used to identify the knowledge container).

Node 300, 310 may have one or more triggers associated with it. In the present invention, dialog control logic is expressed through the use of triggers which consists of a label, a condition, an event and an action. When an event occurs, triggers associated with the event are evaluated. If the trigger condition is satisfied, the action is taken. Below is an example of a simple trigger:

If(under(a12, ts)) {confirm(a3);}.

The left hand side of the trigger is a condition "If (under(a12, ts))" and the right hand side is an event or action "{confirm(a3);}". As shown, the trigger's condition consists of the keyword "if" followed by a left parenthesis, a boolean expression of one or more predicates, and then a right parenthesis. A single predicate may have the form "Condition (concept, concept set)."

These concept sets include:

Topic spotter concepts that have been automatically derived from any text entered by the user of the dialog. The automatic derivation of concepts can be accomplished using statistical text classification algorithms, as described in greater detail in co-pending U.S. patent application Ser. No. 09/594,083, entitled "System and Method for Implementing a Knowledge Management System," which has previously been incorporated by reference.

Confirmed concepts that have been confirmed as accepted nodes in the current dialog, either because they were entered by users in response to follow-up questions, or because they were confirmed by executing a trigger action that performs that function.

Profile concepts that are associated with the user of the dialog. These concepts may indicate the user's interests, expertise level, demographics, previous purchases, entitlements to receive particular information, documents, or services; or any other data about the user.

Preferred concepts that are preferred over other concepts in the same taxonomy, for the current dialog. These "dialog preferences" may be specified as part of a goal declaration or a trigger action declaration and be created when the goal is created or the trigger action is executed.

Other concepts may be created and manipulated via executing trigger actions.

Figure 7:
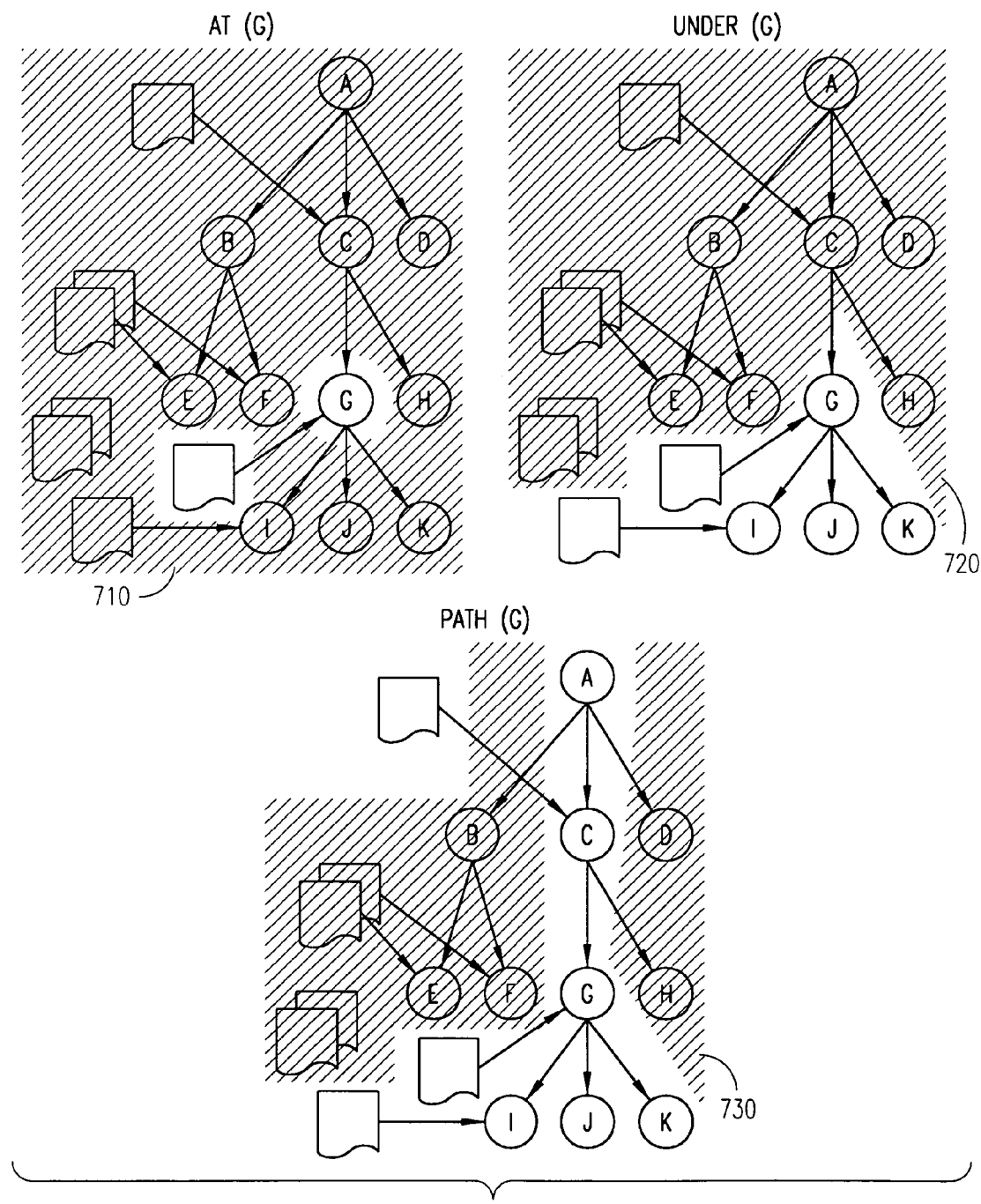
FIG. 7 is a drawing illustrating basic constraints in accordance with an embodiment of the present invention.

For any of these sets, a test in a trigger condition may test whether any or all members of the set satisfy specified predicates. Possible predicates fall into 3 categories: basic, negated, and conditional. The basic predicates are: AT, UNDER, and PATH. As shown in FIG. 7, the AT predicate 710 limits relevant areas of the knowledge map to the specified concept node and restricts documents to those documents that are tagged to the specified concept node. The UNDER predicate 720 limits the relevant areas of the knowledge map to the descendants of the specified concept node in the taxonomy tree and the node itself. It restricts documents to those tagged to the node or one of its descendants. The PATH predicate 730 limits the relevant area of the knowledge map to a specified node, its ancestors and descendants in the taxonomy tree. The PATH predicate likewise restricts documents to those tagged to the node, its ancestors and descendants.

Other basic predicates include: ABOVE—restricts relevant areas of the knowledge map to nodes that are "above" the specified node within the knowledge map; CONTAINS-ONE-OF—restricts relevant areas of the knowledge map to nodes that contain at least one of the nodes in the list of nodes; CONTAINS-ALL-OF—restricts relevant areas of the knowledge map to all of the nodes in the list of specified nodes; PREFERENCE—restricts relevant areas of the knowledge map to the set of preferred nodes in the dialog engine state (previously accepted nodes for goals with constraint type PREFERENCE); LEAF—true if the specified node is a leaf node; ROOT—true if the specified node is a taxonomy root; PARENT—true if the specified node has child nodes; and HAS-DOCUMENTS—true if any available documents are tagged to the specified node. The negated predicates are: NOT-AT and NOT-UNDER.

Figure 8:
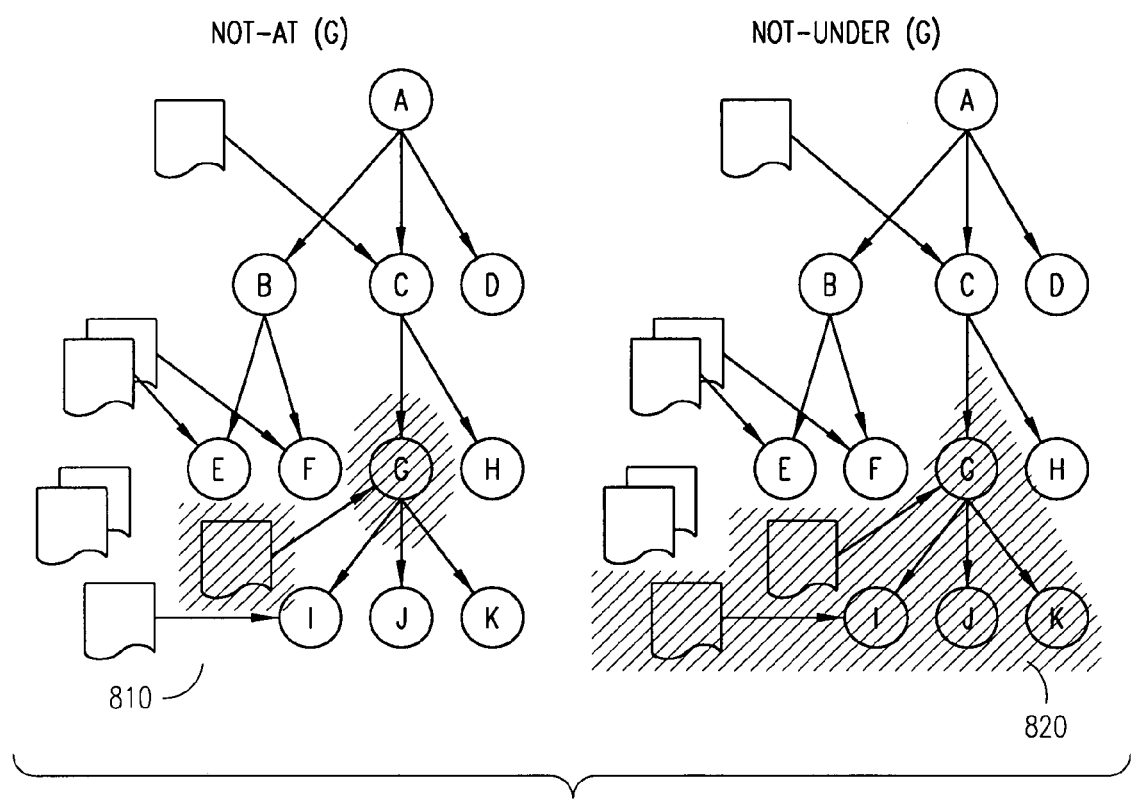
FIG. 8 is a drawing illustrating negated constraints in accordance with an embodiment of the present invention.

As shown in FIG. 8, the NOT-AT predicate 810 limits the relevant area of the knowledge map to everything but the specified node. It also excludes documents tagged to the specified node from the result list. The NOT-UNDER predicate 820 limits relevant areas of the knowledge map to everything but the specified node and its descendants. The NOT-UNDER predicate also excludes documents tagged to the specified node or its descendants from the result.

Figure 9:
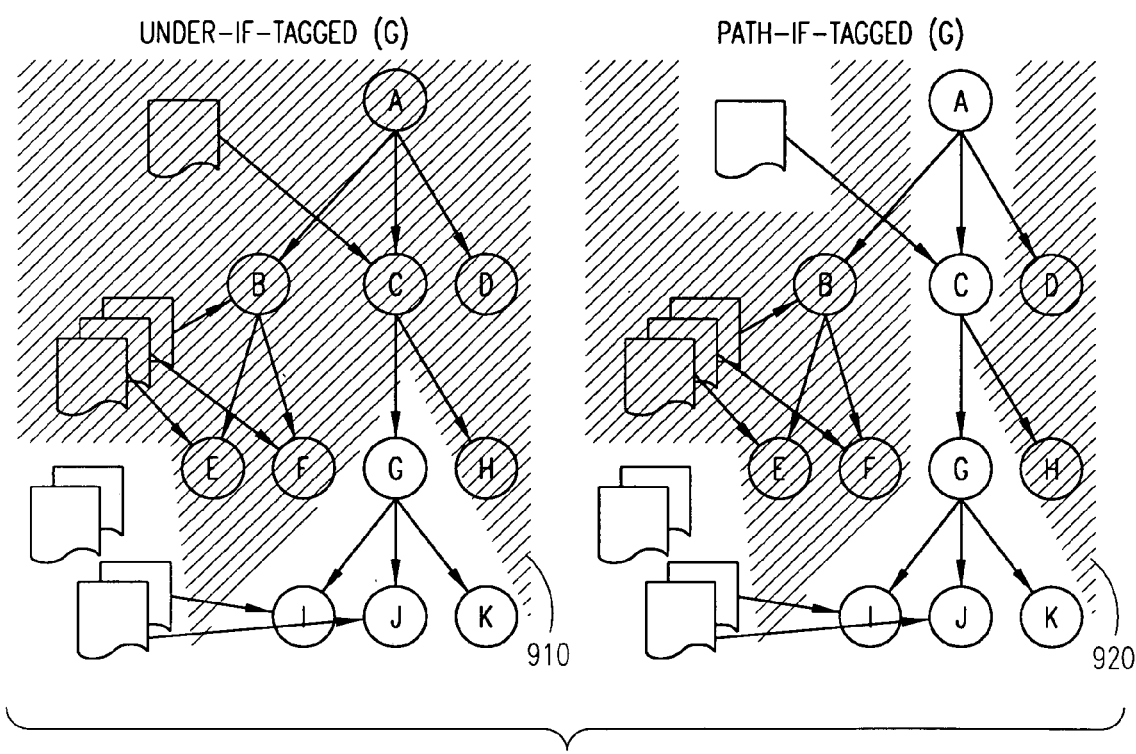
FIG. 9 is a drawing illustrating conditional constraints in accordance with an embodiment of the present invention.

Referring now to FIG. 9, it is shown that the conditional predicates are: UNDER-IF-TAGGED and PATH-IF-TAGGED. The UNDER-IF-TAGGED predicate 910 limits relevant areas of the knowledge map to the specified node and it's descendants. It restricts the document set to documents tagged to the specified node and its descendants plus documents that are not tagged to the taxonomy of the specified node at all. In other words, UNDER-IF-TAGGED restricts away all documents tagged anywhere in the taxonomy, but the node specified or it's descendants. The PATH-IF-TAGGED predicate 920 limits relevant areas of the knowledge map to a specified node, its ancestors and descendants. The PATH-IF-TAGGED predicate also restricts documents to those tagged to the node, its ancestors or descendants, plus all documents that are not tagged to the taxonomy.

While the sample trigger above shows one predicate, it is important to realize that the boolean expression may consist of more predicates connected with the operators "and" and "or". In operation, trigger conditions test various parts of the current state of the dialog. The boolean expression and each of the tests, evaluate (true or false) the current state of the dialog. If the boolean expression is true, then the list of actions of the trigger is executed. In one embodiment, trigger conditions are optional within each trigger. A trigger with no conditions is equivalent to having a trigger condition that always evaluates to "true". That is, if no trigger conditions are present, the action list of the trigger is executed when the triggering event occurs. The actions performed when a trigger is executed can change the current state of the dialog in such a way as to affect the response that is returned to the user.

In addition to tests on concepts and concept sets, trigger conditions can test any other element of the state of the current dialog, such as:

iteration number: the number of responses that have been passed back and forth between the dialog engine and the user. (Predicates on the iteration number would include equals, greater than, and less than);

meta data about the user: tests on any known meta-data about the user of the current dialog; for example, greater-than(age of user, 30);

number of documents "remaining" that may still be applicable to the current dialog. As the dialog progresses, some of the documents in the total set of documents may be "eliminated" from consideration as a document to ever be returned to the user during the current dialog, due to constraints created as the dialog proceeds. Predicates can test the number of documents still remaining that may be returned to the user; and goal resolution: trigger conditions may test whether a particular goal has been resolved at this point in the current dialog; and how that goal has been resolved (e.g. was it resolved by user input; information found in the user's profile; or by a declaration that the taxonomy is irrelevant).

When the triggering condition is evaluated as "true", the event associated with the trigger is executed. A triggering event is an event that changes the current state of the dialog. In general, any event that changes the current state of the dialog—either caused by a user input, by the action of a trigger, or by the dialog engine itself—can act as a triggering event. Each triggering event can have a set of zero or more triggers associated with it, that are evaluated when the event occurs. These include: every iteration, dialog start, dialog finish/quiescence, create a goal, retract a goal, goal resolution, allow action/event, create/remove a constraint, declare a taxonomy as irrelevant, declare a taxonomy as relevant, escalate, allow action/event, add document to output/banner, add other content to output/banner, add other content to output/banner, add document or other content to user's "home page," accept a concept-node, and dialog preference creation.

Every iteration—A "default" triggering event that occurs every dialog iteration (that is, every time a dialog request/response is received from the user's client software by the dialog engine). Triggers associated with this triggering event are evaluated upon every dialog iteration.

Dialog start—Occurs when the first request to begin a dialog is received by the dialog engine from the user's browser or client software. Triggers associated with the dialog start event typically create the initial set of goals to be resolved in the course of the dialog and set up any initial constraints based on the properties of the user (such as their entitlement level).

Dialog finish/quiescence—Occurs when all current dialog goals have been resolved. Triggers associated with the dialog finish event are often used to create new goals based on the resolutions of the current goals. This essentially causes a "sequencing" of the dialog in which, for instance, goals A, B, and C are resolved first; and their completion causes creation of goals E and F next, etc. Since quiescence can occur multiple times within a complete dialog, dialog finish/quiescence triggers are often evaluated more than once during a dialog.

Create a goal—Adds a new dialog goal to the current dialog's set of goals to be resolved. The create goal action can indicate any of the parameters that specify a dialog goal and how it is to be resolved. These include: the taxonomy associated with the goal;

the starting concept-node point in that taxonomy;

what type(s) of constraints or preferences the goal creates;

the set of target nodes for the goal;

whether the goal can be resolved by using a known preference or concept-node tag within the user's profile information, if an appropriate one is known;

whether the goal can be resolved by using a concept-node tag derived automatically from the text of any question the user typed in as part of this dialog, if one is available;

if resolving the goal requires asking the user follow-up questions, what type(s) and format(s) of follow-up questions the dialog engine should generate and return to the user (possible types of follow-up questions are described below);

whether the goal is resolved when any one of the subgoals is resolved, all of the subgoals are resolved, or some fraction of the subgoals are resolved similarly, whether users are allowed to give only a single answer to follow-up questions generated from this goal, or can select multiple answers.

Retract a goal—Removes a dialog goal from the current dialog's set of goals to be resolved.

Goal resolution—Occurs when a particular goal is resolved. In some embodiments, goals may be given symbolic names when they are created so that triggers may be easily associated with the goal resolution event for the goal. As described above, trigger conditions may test specifics of how the goal was resolved.

Allow action/event—As described above, a trigger action can cause the option of executing an action to be displayed to the user. If the user selects the option, this can either cause a specified action to be executed (as described above), or it can cause a triggering event. This allows a dialog designer to associate one or more triggers with the event of the user selecting the action. This is powerful because it gives the dialog designer the ability to create any number of "named" groups of triggers that can be evaluated when the user selects an allow-action indicator.

Create/remove a constraint—Adds a new, specified constraint to the set of constraints applicable to the current dialog; or removes an existing constraint. Constraints limit the set of documents and concept-nodes that will be considered for return to the user in subsequent dialog responses generated by the dialog engine. Thus, triggers associated with this event can be thought of as "attached" to the particular concept node. As described above, concept-nodes can be accepted within initial inputs to the dialog, by a user's selection during the dialog, and by actions of triggers.

Declare a taxonomy as irrelevant—Causes the specified taxonomy to be treated as "irrelevant" by the dialog engine for the remainder of this dialog. That is, the taxonomy and concepts within it will not be used to rank or constrain the set of documents being returned to the user; and any not-yet-resolved goals associated with a taxonomy will be resolved as irrelevant. Constraints based on nodes in the irrelevant taxonomy are removed from the dialog engine's state.

Declare a taxonomy as relevant—Similar to above, causes the specified taxonomy to be treated as "relevant" by the dialog engine. That is, the taxonomy and concepts within it may be used to rank or constrain the set of documents being returned to the user.

Escalate—Causes information about the current state of the dialog to be formatted and forwarded to either a human expert or another automated system for further processing. This action may or may not end the current dialog. In some embodiments, a variety of modes of interaction with an expert may be initiated by the action depending on the action's parameters. For example, escalate can cause a "live chat" type of interaction with a human to appear within the user's web browser or other software client being used to interact with the dialog engine. The escalate action can cause some or all of the dialog state information to be forwarded to the human service representative at the other end of the live chat, thus allowing them to provide higher-quality service by knowing what questions, follow-up, documents, etc., the user has viewed and chosen during the dialog interaction so far. Other alternatives include: escalation to a call center in which a human customer service representative will call the user; to a call center in which the user may call a service phone number, but then will talk to a customer service representative who has the information available about the dialog the user had with the dialog engine before escalation occurred; a "voice-over-internet protocol" interaction, in which a human customer service representative can have a voice conversation with the user through the user's computer, that is transmitted using the network that connects the user's computer with the service representative's work station.

In some embodiments, an appropriate human service representative, group of human service representatives, and/or automated response system, may be chosen automatically by dialog engine 232 based on the characteristics of the user (e.g. their interests, their entitlements, their business relationship with the company providing the dialog engine) and/or of the dialog state (e.g., the product, symptom, or issue being discussed in the dialog). In other embodiments, the appropriate human service representative, group of human service representatives, and/or automated response system, may be simply indicated as a parameter of the escalate action that is recorded by the dialog designers within a trigger. In still other embodiments, the appropriate human service representative, group of human service representatives, and/or automated response system, may be selected by a system external to the dialog engine based on the characteristics of the user and/or of the dialog state.

Allow action/event—Creates a "button" or other indicator within the output of the current (and possibly subsequent) dialog steps, such that when the button or indicator is then selected by the user, the specified action or event will be executed by the dialog engine. In general the action can be any action that can appear in the action list of a trigger, including actions added to the dialog engine to extend it, as described below. For example, a trigger may "allow action(escalate)", causing the user to be presented with the option of escalating to a human service representative on subsequent screens. If and when the user selects this action, the escalate action described above is executed by the dialog engine. Alternatively, allow-action can be given parameters that will cause the selection of the allow-action to cause the user's browser or other client software to initiate a request to some other system outside of the dialog. For example, a trigger may "allow action(shopping cart)" causing the user to be presented with the option of adding some product to their "shopping cart" of items to purchase on subsequent screens.

Add document to output/banner—Adds an indicator of a document (e.g., its title and possibly other summary information, hyper-linked to a screen that presents the whole document) to the dialog engine's response to the user. In some embodiments this indicator can be added to the dialog engine's response in a specific part of the response that we will refer to as the "banner". This action, combined with the one below, allows dialog designers to write triggers that (among other things) can be used to produce an intelligent "cross-selling" capability, in which users are presented with documents, banner "advertisements", or other information, at appropriate points in their dialog with the dialog engine. These points are identified by the trigger conditions and triggering actions in the triggers that add things to the banner area.

Add other content (e.g. XML) to output/banner—Like the action above, this action adds any content the dialog designer wishes to the dialog engine's response to the user. In some embodiments this indicator can be added to the dialog engine's response in a specific part of the response that we will refer to as the "banner". In one embodiment, as described above, the dialog engine's responses are cast in a standard syntax such as XML; in these embodiments this action may simply add specified XML into the response.

Add document or other content to user's "home page"—In some embodiments, the dialog engine keeps track of a "home page" of information for each user. This "home page" can include documents, questions with known answers, parameterized queries (PQ's) (as described below), concept-nodes, dialog responses, and other information, that is thought to be relevant to the user. This trigger action adds a link to a document or other content of the kinds just listed to the current user's home page. When combined with the "allow action" action described above, for example, this action could be used to give users the option of "bookmarking" documents or other dialog-related information on their home page, for later use, by selecting an allow-action indicator that initiates this action.

Accept a concept-node—Occurs when a particular concept-node is accepted during the course of the dialog. This event adds the concept-node to the set of known confirmed accepted concept-nodes. The concept-node can subsequently cause goals to be positively resolved or advanced; and can subsequently cause the dialog engine to prefer documents that are tagged to the concept-node. Because confirming a concept-node may be a triggering event (as described below) accepting a concept-node in the action of a trigger causes the triggers associated with the accepted concept-node to be evaluated. Thus, triggers associated with this event can be thought of as "attached" to the particular concept node. As described above, concept-nodes can be accepted within initial inputs to the dialog, by a user's selection during the dialog, and by actions of triggers.

Reject a concept-node—Adds the concept-node to the set of known confirmed rejected concept-nodes. The concept-node is no longer available. This can subsequently cause goals to be negatively resolved; and can subsequently cause the dialog engine to reject documents that are tagged to the concept-node. Rejecting a concept-node is not a triggering event.

Dialog preference creation—Occurs when a particular concept-node is indicated as a preference during the course of the dialog. Thus, triggers associated with this event can be thought of as "attached" to the particular concept node. As described above, preferences can be created as a side-effect of a user's selection during the dialog and by actions of triggers.

The last two triggering event types described—concept-node confirmation and dialog preference creation events—can be thought of as ways that triggers are "attached" to particular concept-nodes. Since concept-nodes exist within a taxonomic structure, in some embodiments it is desirable to allow triggers to "inherit" up the taxonomic tree or DAG. This section describes a trigger inheritance mechanism.

To understand why this may be useful, consider a diagnostic dialog case where one taxonomy's concepts indicate symptoms a user is experiencing and a $2^{nd}$ taxonomy indicates product vendors. One concept-node within the symptoms taxonomy is "printing problems", and it has a number of children and grandchildren that indicate more specific kinds of printing problems. Within this environment, a dialog designer wishes to create a goal in the product-vendor taxonomy, starting at the "printer vendors" concept-node, whenever any kind of printing problem is confirmed.

Without trigger inheritance, the dialog designer could associate the trigger that creates the "printer vendors" goal with the concept-node-confirmation event of the "printing problems" node and every descendant concept-node below "printing problems," but it would be very inconvenient.

With a trigger inheritance mechanism, the dialog designer would associate the trigger that creates the "printer vendors" goal only with the concept-node-confirmation event of the "printing problems" node. Whenever a concept-node below "printing problems" is confirmed, the trigger inheritance mechanism evaluates not only the triggers associated with that concept-node's confirmation event, but the triggers associated with confirmation events of each of the concept-nodes above that concept node—including the "printing problems" node.

Stated more generally: the trigger-inheritance mechanism applies to events that are per-concept-node, such as the concept-node confirmation and dialog preference creation events. Whenever one of these events occurs, the triggers at the concept-node for which the event occurred are evaluated first; then, the triggers associated with the same event at the concept-node's parent(s) are evaluated; then, the concept-node's grandparent(s); and so on, until the top of the taxonomy (a concept-node with no parents) is reached. In some embodiments, trigger-inheritance may be limited to a specified number of steps up the taxonomy.

In some embodiments, it may be desirable to add to this simple mechanism a further way of controlling to which triggers inheritance does and does not apply, so that the dialog designer can "override" inheritance when so desired.

Consider the "printing problems" example. Perhaps there is a particular kind of printing problem (indicated by, say, a grandchild concept-node of the "printing problems" node) for which the "printer vendor" is in fact irrelevant, and instead (say) the vendor who manufactured the cable connecting the printer to the user's computer is important. In such a case, the dialog designer would like all of the other nodes under "printing problems" to inherit the trigger that creates the "printer vendor" goal; but would like to "override" that inheritance for the "printer cable problem" concept-node, and instead, in that concept-node, use a trigger that creates a goal to resolve the "printer cable vendor".

One scheme that can be used to support this type of inheritance overriding uses optional labels on triggers to indicate to the dialog engine when to evaluate an inherited trigger and when not to do so. In this scheme, only one trigger with a given label will be evaluated in response to a particular triggering event.

In the printing example, the dialog designer would simply place a label (such as "print_vendor_trigger:") on both the trigger associated with the "printing problems" concept-node and the trigger associated with the "printer cable problem" concept-node. When "printer cable problem" becomes confirmed, the dialog engine will evaluate the trigger associated with the "printer cable problem" concept-node, but will then not evaluate the trigger with the same label in the "printing problems" concept-node—thus effectively overriding it. When other concept-nodes descended from "printing problems" are confirmed, the trigger associated with "printing problems" will be evaluated just as before.

In some embodiments these trigger actions can be aggregated into named functions, which may be called with input and output parameters, from other actions, thus forming a type of programming language. Indeed, the whole trigger could be expressed as an "if" statement in a programming language. In other embodiments there may exist a way to extend the set of predicates (possible conditions) and the set of actions by incrementally adding new predicates or actions implemented using any external programming language, such as Java, C++, C, Basic, Perl, or Fortran. This could be used, for example, to allow a trigger to test a condition associated with a user of the dialog engine that is actually stored or derived from a database or system that is external to the dialog engine, such as an external database of customer information, security and entitlement information, etc.

Figure 10:
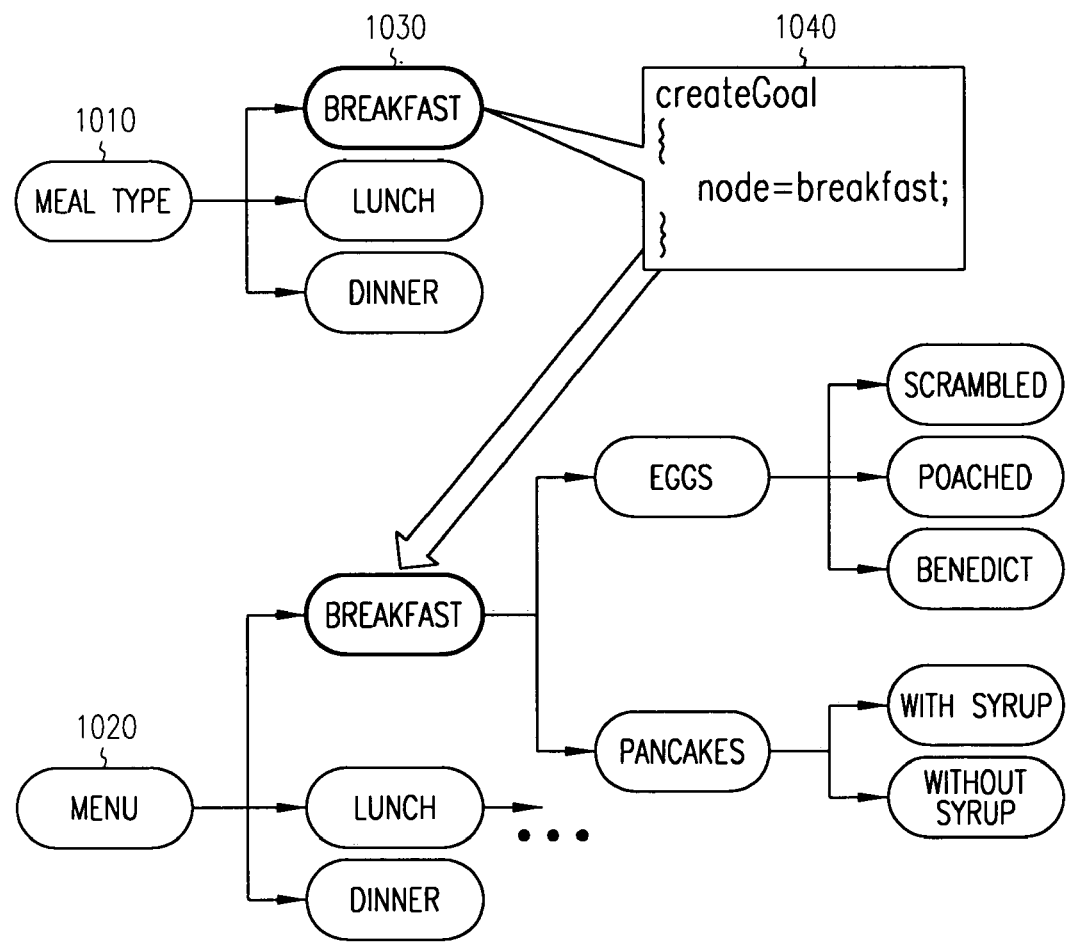
FIG. 10 is a drawing illustrating triggers in accordance with an embodiment of the present invention.

There are several types of triggers, the most common being a concept trigger. A concept trigger is associated with a set of concept nodes in a knowledge map and is activated when the dialog advances to those nodes. That is, when a node is confirmed, all the triggers associated with that node are evaluated, and if their conditions permit, the triggers are executed. In this and other instances where an event depends on reaching a set of nodes, the dialog designer can specify whether the event takes place when one member of the set is reached, all members are reached, or a proportion of the set is reached. The notion of a concept trigger is further explained with reference to FIG. 10. There are two taxonomies shown in FIG. 10, a meal type taxonomy 1010 and a menu type taxonomy 1020. When a user states that they want breakfast, node 1030 becomes confirmed. When that occurs, trigger 1040 is executed. Trigger 1040 causes the system to open the menu to the section entitled "Breakfast". As explained further below, a trigger's actions can cause new dialog goals to be created (thus causing follow-up questions to be generated); can add constraints to the taxonomy areas under consideration; and can cause escalations to occur.

Information about the user and the dialog interaction is continuously captured in a dialog state which is stored and passed along with each user request/response. The dialog state maintained by the dialog engine includes but is not limited to the following:

Focus nodes;
Target nodes;
Constraints;
Background preferences;
Dialog preferences;
Confirmed nodes, both accepted and rejected;

Goals, both active and resolved;

Root nodes of goals;

Nodes returned by autocontextualization;

Text returned by the interface module, including query text submitted during any iteration by the user;

Taxonomies to which autocontextualization is applied;

Taxonomies from which documents are retrieved;

Taxonomies within which dialog navigation occurs;

The history of the interaction (inputs, events, actions, and outputs of previous iterations); and The user's ID.

Each of these elements will be more fully explained below.

A. Focus Nodes/Target Nodes

Each goal is comprised of one or more "target" concept nodes paired with one or more focus nodes. The concept nodes represent the node or nodes within the taxonomy at which the dialog will ultimately terminate, while the focus node represents the starting location in the taxonomy. The focus node of the goal captures the current status of the goal resolution process. The focus node is the most detailed information available to the dialog engine at each point in the dialog. Each question posed to a user is generated from the focus node of the goal, while the answer selections offered to the user are the focus node's children. In some embodiments, each user question results in a single set of focus nodes and a single set of target nodes. In other embodiments, there may be multiple sets of focus nodes and target nodes, such that each set of focus nodes is paired with a set of target nodes.

B. Constraints

The set of concept nodes relevant to the user's information need is denoted using constraints. Constraints play a dual role in a dialog: they constrain the concept space to limit or guide the interaction and they restrict documents returned to the relevant areas. All concept nodes that have not been explicitly ruled out with constraints are termed available. Thus in the beginning of the dialog all concept nodes in the knowledge map are typically available. As a dialog goes through successive iterations, the set of available concept nodes shrinks. Each node accepted during resolution of the goal produces a <predicate> <node> expression that thereafter constrains the available nodes. The list of accepted nodes in each subgoal is used to generate positive constraints while the rejected nodes are used to generate negative constraints. Negative constraints control the effect of negative information gathered (rejected concept nodes) on the relevant concept space. In addition, a default negative constraint may be used if the dialog designer does not specify one. As in the case of positive constraints, negative constraints stemming from the same subgoal are joined together by a boolean operator. In some embodiments only a subset of the negative constraint types are allowed. In one embodiment, NOT-AT is the default negative constraint type. In this embodiment, all the rejected concept from each subgoal generate a constraint NOT-AT <node>. Both positive and negative constraints are unified for the final expression from a subgoal and constraint expressions from different subgoals within a goal are joined together.

The set of available nodes influences:

The set of documents that are deemed by the system as relevant to the user query;

Regions of taxonomies from which focus nodes and target nodes may be drawn;

The target concept set of a goal;

Possible solutions (parameterized queries (PQs)) proposed to the user; and

Other actions that may be triggered.

Constraints are expressed as constrained boolean expressions consisting of taxonomic predicates that define sets of nodes by taxonomic relationships. For example, if a goal constraint type is UNDER and concepts a and b are accepted in a subgoal, UNDER a and UNDER b constraint expressions will be generated. All constraint expressions from a single subgoal are aggregated into a boolean formula. The dialog designer can specify the operator to be used at the goal level. In the implemented embodiment, the default operator is conjunction. In our previous example, the final expression generated from the subgoal will be (UNDER a) AND (UNDER b). If the goal contains more than one subgoal, the subgoal constraint expressions are assumed to be a part of a boolean expression. The dialog designer can specify what operator to use for a given goal. In an embodiment in which the most common interpretation of multiple user selections is uncertainty, the default operator is disjunction. So, if in addition to the subgoal in the previous example, there was another subgoal with accepted node c, the goal would produce the following constraint: ((UNDER a) AND (UNDER b)) OR (UNDER c).

In addition to taxonomic constraints, the present invention also utilizes meta-data constraints that limit the remaining document set based on meta-data associated with documents. A meta-data constraint could for example, limit the document set to documents written by a particular author or list of authors; documents created or modified during a particular range of dates; documents whose titles match a given textual pattern; documents that were originally drawn from a particular document source, etc. Taxonomic and meta-data constraints can be embedded in a boolean expression to create an overall constraint.

C. Background Preferences/Dialog Preferences

Preferences are used in ranking to influence the order of presentation of documents. Background preferences allow the system to keep basic information about each user (e.g., their interests, computer hardware, software, etc.) and dialog preferences describe concepts that are of interest to the user in the context of the current information request. Background preferences and dialog preferences may affect ranking by different amounts. That is, in one embodiment, dialog preferences have a greater affect on ranking than background preferences and, in a second embodiment, background preferences have a greater effect on ranking than dialog preferences. The relative effect of one kind of preference over the other is a system parameter that may be changed from installation to installation.

The combination of taxonomies, taxonomy tags, taxonomic restrictions (filters), and knowledge containers provide a large collection of personalization capabilities to the present system. Certain of these taxonomies can be used to: capture the universe of information needs and interests of end-users; tag the knowledge containers representing these users with the appropriate concept nodes from these taxonomies; and use these concept nodes when retrieving information to personalize the delivery of knowledge containers to the user. Further, the system can use this tagging and other aspects of the knowledge containers in order to create a display format appropriate for the needs of the user receiving the knowledge container.

In order to personalize interactions with a specific customer, the system utilizes an application screen associated with browser 132 for representing customers, their interests and needs. The application screen is a user interface that poses questions to the user and based on the user's response returns nodes back to dialog engine 232 to begin the next iteration. The application screen can be programmed to automatically give dialog engine 232 any information the user could otherwise provide. For example, dialog engine 232 could ask whether the user is a novice or expert. An application screen designed for novices could provide this information without actually posing the question to the user. The system supports profiling a customer's interaction with the system explicitly based on stated or applied preferences and implicitly based on what the system has learned from interacting with the customer.

Explicit profiling allows the user to select items of interest explicitly from one or more taxonomies. These, along with a default or explicit weight, become inputs to the application screen. Implicit profiling, on the other hand, relies on the system to add or modify the application screen in order to profile the customer. For example, when creating the application screen, the system may set a concept in "access level" or "entitlement level" taxonomies that match the privileges they wish to accord the end user whom the application screen represents. The system may alternatively observe user behavior and then modify the application screen accordingly. That is, the system can increase the weight of a taxonomy tag frequently spotted in the user's questions during the autocontextualization segment of the retrieval process. Finally, the business context of the interaction, including the application screen, can create an implicit profiling which drives the retrieval. For example, a particular web page or email address from which, or to which a question is entered into the system may implicitly add taxonomy tags to the user's question. This particular kind of implicit profiling is typically transient in that it only modifies the current interaction, but does not change the data in the application screen.

In one embodiment of the present invention, the system is capable of using customer profile information described above to push content to interested users. More specifically, when new knowledge containers 20 enter the system, the system matches each against each customer's profile taxonomy tags 40 in the associated the application screen. Knowledge containers 20 that match customer profiles sufficiently closely—with a score over a predetermined threshold—are pushed to customers on their personal web pages, through email, or via email to other channels.

The type of preferences generated from a goal is controlled by the dialog designer. Similarly to constraints, positive preferences are generated from the accepted nodes and negative preferences from rejected nodes. An arbitrary predicate can apply to preferences to define the set of nodes as desirable or undesirable. Unlike constraints, all preferences are added to a common pool, with no boolean logic associated with them. This follows from their use in ranking rather than as set operators.

Constraint and preference types are set per goal so that accepted and rejected nodes of different goals (from different taxonomies) can have different effects on a particular dialog. For example, consider a Vendor's and SymptomObserved taxonomy. If a user indicated that the symptom they observed was "garbage text printed" and they have an HP printer, the user would not be interested in seeing any document about printing problems other than garbage text being printed. At the same time, if the problem can be general to any printer, they would want to see documents that describe resolutions non-specific to HP printers. Therefore, different constraints should be generated from the two goals.

D. Confirmed Nodes

From the point of view of dialog engine 232, a dialog with a user involves the process of arriving at the set of nodes that best describes the user's information need. Confirmed nodes are those nodes whose relevance to the user's information need has been established. They capture information that is known about the user's information need at each point in the interaction. Confirmed nodes are established based on: user selections on the screen; relationships in the domain encoded via triggers; automatic confirmation of topic spotter nodes; automatic confirmation of user preferences; and the front end graphical user interface (GUI). Discovering the best set of concept nodes will cause the presentation to the user of that set of knowledge containers that is most likely to contain a problem resolution. Three distinct states of confirmed nodes are recognized:

A node known not to be relevant to the user's information need, is referred to as irrelevant or rejected—one instance of such a set is an irrelevant taxonomy;

A node that may or may not be relevant is marginal; and

A node that is known to be relevant is termed accepted and we refer to the set of accepted nodes.

E. Goals

A goal in the context of the present invention indicates the information requirements for the next step in the interaction and the guidelines for eliciting the information from the user. Creating a goal in a taxonomy: (1) signals that the domain of the given taxonomy is relevant to the interaction; (2) it identifies the information needed; (3) provides guidance on how best to elicit needed information from the user; and (4) establishes how to deal with uncertainty arising in the process of information gathering. This builds on a basic observation that in a dialog, specific information becomes relevant only in certain circumstances. For example, in a dialog for troubleshooting printers, the type of network between the computer and printer is only relevant once it is established that there is a problem in communication between the two devices. An important innovation of the mechanism is that it allows the dialog engine to pose a question only once it has become relevant (but without requiring a complete case-based analysis).

In one embodiment of the system only one goal can be created in a taxonomy. In another embodiment, multiple goals can be created in a taxonomy, where each goal represents a target set of concepts in a context. For example, the HW Vendor Taxonomy 330 (FIG. 6) may be needed multiple times—to establish the vendor of the printer, the printer driver, and software that is used for printing. In this example, the context for each goal in the taxonomy will be the device whose vendor the system is trying to identify. Thus, the context of a goal can be represented by the concept node whose trigger created the goal or as the taxonomy in which the concept node is located.

Once dialog engine 232 creates an initial set of goals (target nodes and focus nodes) based on the subject matter of the user's inquiry, it begins to resolve the goals. The process of goal resolution is one of taxonomy traversal, going from more general concepts at the root to more specific concepts closer to the leaves of the taxonomy graph. Advancing a dialog from one node to the next advances the focus of the goal, it causes the triggers associated with each node to be evaluated and it causes constraints to be generated. A goal is considered resolved when a target set of concept nodes is reached during a traversal. When dialog engine 232 receives an answer from a user, it identifies one or more goals for the dialog, based on the dialog engine's current understanding of the user's response. Dialog engine 232 improves its understanding of the user's initial question by conducting a multi-step dialog with the user. Based on the user's responses to follow-up questions, the dialog engine is further able to focus its analysis of the user's response (i.e., limit the remaining sets of concepts by creating constraints). In other words, dialog engine 232 seeks to describe the user's information request in more and more detail by mapping user responses to concept nodes in the goal taxonomy.

Figure 11:
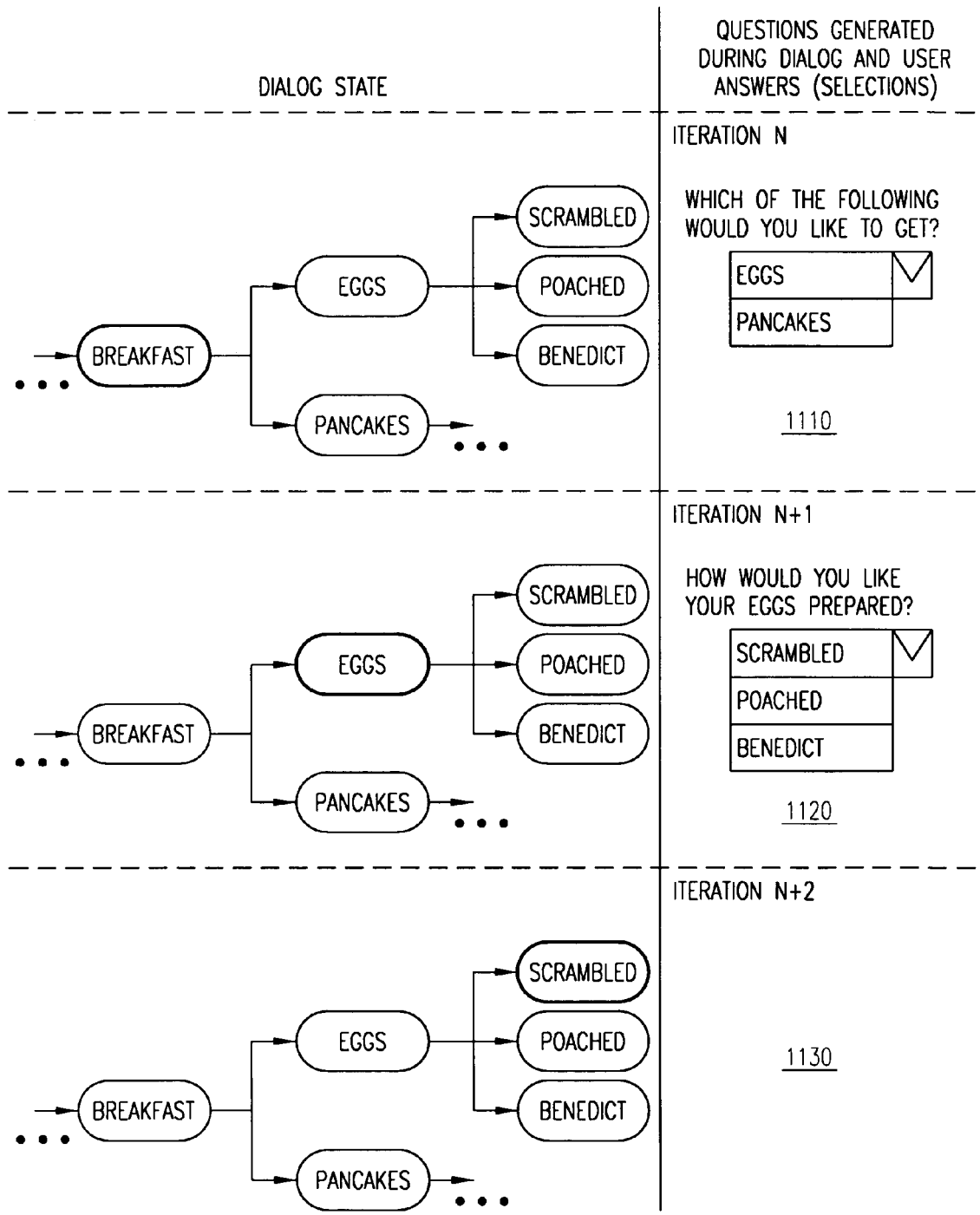
FIG. 11 is a drawing illustrating the goal resolution process in accordance with an embodiment of the present invention.

FIG. 11 further illustrates the goal resolution process in accordance with an embodiment of the present invention. As shown in FIG. 11, the subsequent selection of a new concept node by dialog engine 232 proceeds as the user answers questions posed by the dialog engine. As shown at 1110, when the user answers "eggs" in response to the question "Which of the following would you like to get," the goal of the dialog proceeds from the "Breakfast" node to the "eggs" node. Similarly, in 1120 when the user answers "scrambled" in response to the question "How would you like your eggs prepared," the goal of the dialog proceeds from the "eggs" node to the "scrambled" node 1130. In this example, the nodes selected are confirmed nodes since they represent nodes whose relevance to the user's information need has been established.

In an embodiment where each goal is tied to a particular taxonomy, the target set of concept nodes is a function of that taxonomy. The target set can also be defined in any of the following ways:

All leaf nodes in the target taxonomy;
Any node or set of nodes in the target taxonomy designated explicitly by the dialog designer;
Any node in the target taxonomy that is at or below level K in the tree;
Any node in the target taxonomy that is K or fewer levels below a subgoal focus node;
Any set of nodes in the target taxonomy that can be defined by any taxonomic distance function from a node specified by the dialog designer; and
Any set of nodes in the target taxonomy that can be defined by a non-taxonomic-distance function from either the root node of the goal or from a node specified by the dialog designer, such as document overlap among the nodes, or similarity of vocabulary of documents at the nodes.

A goal may be resolved positively or negatively. A goal is resolved positively when one, some, or all (depending on what the dialog designer specified) of its target concept nodes are confirmed as accepted. A goal is resolved negatively when all of its target nodes are confirmed as rejected or constrained to be unavailable, or when its taxonomy is declared irrelevant. In the process of goal resolution the system traverses the taxonomy graph typically going from more general to more specific concepts. The process of choosing one path over another is sometimes difficult, particularly if there is uncertainty as to which branch applies or when multiple branches are relevant. It is a good practice during taxonomy building to avoid branches that are likely to be difficult to choose between, but it is not possible to avoid the issue entirely.

If such a situation occurs, and the user chooses multiple nodes at a branching point, the dialog engine will create multiple subgoals for a goal. Subgoals of a goal are a mechanism to deal with uncertainty or multiplicity of the interaction. Resolution of each subgoal will be pursued in parallel by the dialog engine until the conditions are reached that resolve the parent goal of the subgoals. In fact, the system uses properties of subgoals in the process of goal resolution, so one subgoal is always created. Subgoals are identified by the node that represents the most detailed information. This node is referred to as focus of a subgoal. In the process of goal resolution, the focus is typically advanced along the edges of the taxonomy graph, but may jump to a node (or set of nodes) more than one edge away from the previous focus. Subgoals are resolved when their focus reaches the target set of concept nodes.

Note that the constraints generated in the course of a dialog can limit the node set available beyond the initial set specified in the goal, and occasionally all the choices will be ruled out rendering a subgoal unresolvable by normal means. In this case, a subgoal is designated to be constrained away and is treated as resolved. In the present invention, any combination of subgoal resolutions may be sufficient to resolve the subgoal. For example, reaching any node in the target set of any subgoal may be sufficient. However, if the user made multiple selections and several subgoals were generated, resolving one may not be enough to completely establish all the nodes relevant to the user's information request in the given taxonomy. In one embodiment the dialog designer can choose to resolve a goal when:

Any one of the subgoals is resolved;
All of the subgoals are resolved; or
Some fraction of the subgoals is resolved.

This provides maximum flexibility in interpreting multiple choices of the user.

In an embodiment where each goal is tied to a particular taxonomy, the target set of concept nodes is a function of that taxonomy. The target set can also be defined in any of the following ways:

All leaf nodes in the target taxonomy;
Any node or set of nodes in the target taxonomy designated explicitly by the dialog designer;
Any node in the target taxonomy that is at or below level K in the tree;
Any node in the target taxonomy that is K or fewer levels below a subgoal focus node;
Any set of nodes in the target taxonomy that can be defined by any taxonomic distance function from a node specified by the dialog designer; and
Any set of nodes in the target taxonomy that can be defined by a non-taxonomic-distance function from either the root node of the goal or from a node specified by the dialog designer, such as document overlap among the nodes, or similarity of vocabulary of documents at the nodes.

The subject invention also permits the user, dialog designer, or dialog engine to retire a subgoal or goal. The user may not wish or be unable to answer questions posed by a subgoal. In this case the invention provides a way to inform the system that they do not wish to see any more questions on the subject. The user may choose to ignore the questions posed, in which case the system will stop showing those questions. In one embodiment, the number of iterations a question is generated from a subgoal in the absence of a user response before the subgoal is retired is a parameter of the goal. In another embodiment, the parameter is a system-wide setting. At some point in a dialog new information may become available that will render a goal irrelevant. Dialog designer can trigger an action to retire a subgoal or a goal in this situation. This description discusses the process of goals and subgoals advancing interchangeably, with the understanding that advancing a goal implies advancing one or more of its subgoals.

Multiple goals can be active in the system at any point in the dialog, and the process of resolving goals may proceed serially or in parallel. A dialog in which questions are posed strictly sequentially may be constructed by asking a single question per goal. Such a dialog however, does not typically correspond to a natural, friendly, and efficient interaction. Posing questions in parallel, on the other hand, allows the user to answer relevant questions and simply ignore irrelevant questions. Until resolved, a goal is referred to as active.

F. Root Nodes

Creating a goal signifies that the goal taxonomy is of relevance to the interaction. The root node of the goal serves as the starting position in the taxonomy for information elicitation—it is the focus node in the first dialog iteration that incorporates that goal. For example, assume a vendor taxonomy exists in a knowledge map that represents various hardware and software vendors (see FIG. 6). Further, suppose that during a dialog the system establishes that the user's problem relates to improper color printing by the printer. It may be important at this point to establish the vendor of the software the client is using, since color rendering may be handled differently by different programs. The situation warrants creation of a goal in the vendor taxonomy that seeks to identify the software vendor. In an intelligent interaction, the question to be asked would be more specific than the one generated from the root of the vendors taxonomy. To support such an interaction, when creating a goal for vendor, the dialog designer should specify software vendor as the root node.

G. Nodes Returned by Autocontextualization

The dialog engine can derive information from text that is typed in by the user. This process of deriving data is one of the many ways in which the dialog engine gathers information. All the text the user provides to the system is autocontextualized against the taxonomies in the knowledge map. This results in topic spotter nodes that represent the system's understanding of the user's input. Unlike confirmed nodes (discussed above), topic spotter nodes cannot automatically accepted as true since there ia always the possibility that dialog engine 232 misunderstood the user's input. Nodes returned by autocontextualization (topic spotter nodes) are verified by asking a follow-up question to confirm dialog engine's understanding of the user's input.

H. The History of the Interaction (Inputs, Events, Actions, and Outputs of Previous Iterations)

In one embodiment, the history of the traversal in the process of resolution is stored in a subgoal as a list of accepted and rejected nodes. Keeping such history is an important feature of the dialog system, since it allows the end user to undo her previous answers if the need arises. The list of accepted and rejected nodes is also important for generating constraints and preferences based on user information that will help to better define the concept space relevant to the user query (and thus limit the document set retrieved and affect future dialog iterations). Finally, storing information about the path of the interaction up to the current point allows the dialog engine to base future decisions on the complete history of the interaction, not simply the current state.

In operation, dialog engine 232 records the interactions between dialog engine 232 and the user for future analysis. These logs may be stored either as structured log files, or as data within a relational or other type of database system. The logs can record any and/or all aspects of the dialog engine's interactions with users, including but not limited to:

User's names, associated concept-node tags and their strengths from the user's profile (which may include information about user's interests, user's business relationship with the company providing the dialog engine, user's entitlement level, user's experience level with the company's products or services, products the user owns or has shown interest in the past, etc.), and associated meta-data, for the user involved in each dialog;

For each iteration of each dialog, all of the possible inputs entered by the user, including textual input, responses to questions that involve selecting concept-nodes, responses to questions that involve entering text or other types of information, selection of actions, escalation, selection of documents for viewing, selection of packaged or parameterized question; selection of going "back" in the dialog to a previous point to start over or to re-select inputs for a particular iteration or follow-up question;

For each iteration of each dialog, the response returned by the dialog engine, including follow-up questions presented to the user, choices presented for each follow-up question, documents presented, parameterized questions presented, etc; and For each iteration of each dialog, any and all relevant information about the dialog engine's internal state and processing, which may include goals created, goals resolved and how they were resolved, concept-nodes identified automatically by text classification of a user's question or other similar means, triggers and other actions executed, the membership of the set of confirmed concept-nodes; the set of automatically-identified (text classified or "topic spotted") concept nodes; the set of dialog preference concept-nodes; the set of user's preference concept-nodes; constraints that are applicable to the dialog; etc.

These logs provide an extremely rich source of feedback about usage of dialog engine 232 and the success of the knowledge map and dialog control information within the dialog engine in leading users to documents and other types of resolutions to their questions.

The present invention further provides a logging capability in which:

Users may be logged not just with an ID but with all the concept-node tags and meta-data that represent what's known about the user. This allows analysis of the log broken down by users with particular properties;

Logging records each of the steps within a multiple-step dialog interaction with a user, as opposed to simply separate actions (clicks and queries). The dialog engine thus logs series of interactions in coherent groups that can be analyzed together. In addition, these series allow sequential analysis of user's actions. For example, the present invention can analyze not just how many times users took the action of, say, escalating their problem to a human customer service representative, but what dialog sequences and user properties most often lead to escalation; and All logging is done in "semantic" terms—that is, concept-nodes within taxonomies. These taxonomies and concept-nodes represent dimensions and concepts that are relevant to the company providing the dialog engine's business. As opposed to normal world-wide-web logging, which simply provides undifferentiated "click"

data, this concept-based logging allows analysis of the interaction data based on concepts that are truly relevant, as opposed to "syntactic", surface information such as word frequency of words typed into a query box.

Once the data has been collected, reports can easily be generated against the logged data that will provide answers to questions such as:

Which types of users are easily finding answers to their questions concerning concepts in a particular taxonomy? (In a diagnostic environment, for example, this might be "Which types of users are easily finding answers to their questions about what products and what symptoms they are having with those products?")

Which types of users are not finding answers to their questions concerning concepts in a particular taxonomy? Of those, which are quitting (simply leaving the dialog engine interaction); which are escalating to human customer service representatives; which are starting over with new dialog interactions; which are examining large numbers of documents returned by the dialog engine to "by hand" find the one(s) that address their questions?

Which areas or concept-nodes within taxonomies (or groups of such) have an appropriate amount of content/documents tagged against them such that it is proportional to the amount of user questions or issues being seen in those areas or concept-nodes and, conversely, which areas do not have enough content to support the volume and range of users' questions or issues?

Which areas or concept-nodes within taxonomies (or groups of such) are experiencing high volume, or changing volume (spiking up or down over time) of user questions or issues?

In some embodiments, the dialog engine or a separate piece of software may provide a way to visually examine taxonomy and concept-node based breakdowns of analyzed or aggregated logging data over all time, or over particular selected time periods. This visualization is performed by displaying the structure and concept-nodes of one or more taxonomies visually and with each concept-node, providing a visual cue that indicates the value of the analyzed or aggregated logging data point being reported, for that concept-node. The visual cue may be, for example, displaying the concept-nodes in different colors (e.g. red may mean a low value, green a high value, and the range of colors in between representing intermediate values); or by displaying a numeric value next to each concept-node; or by displaying one or more icons next to each concept node (e.g. a small, medium, or large stack of question-mark icons to represent query volume at each concept-node). This type of visualization can be very useful because it allows a dialog designer to get an overall view of the activity or aggregated/analyzed values across a whole taxonomy or set of taxonomies at once. The visual cues allow a person to very quickly identify the areas of taxonomies that may warrant further attention or analysis.

In some embodiments, "reporting wizard" software may be available that can execute a large number of different useful logging data analyses, over all time or over specific timeframes of the dialog engine's use, and then use selection heuristics to select and present a dialog designer or other user with a listing of the most "interesting" set of reports, based on the selection heuristics. Typically, the selection heuristics would select reports that were very different from the norm of a family of similar reports, or that indicate areas where users are not effectively finding good resolutions to their questions or issues during their interaction with the dialog engine. For example, the selection heuristics may try to identify types of users and types of questions (both based on concept-node information, of course) in which users are asking large numbers of questions relative to the norm, but are also experiencing a large number of either start-overs or escalations relative to the norm. Similarly, the selection heuristics may try to select reports showing areas where there are "spikes" in user questions, or where the knowledge map is underpopulated with documents to address the volume of user questions. Similarly, the selection heuristics may try to select reports showing frequently asked questions (again, generally in terms of concept-nodes, and possibly user types) that take users multiple iterations to find documents.

In some embodiments, "reporting wizard" software can go one step further, and based on its (generally heuristic) analysis of the interesting reports it has selected, can propose changes to the dialog designer or other maintainer of the knowledge map and dialog control information that may improve the experience of users of the dialog engine. For example, the reporting wizard software may analyze the report showing frequently asked questions that take users many iterations to find documents and propose the creation of a new "parameterized question" that could be presented in applicable situations in earlier dialog iterations, so that users can more quickly get to the documents that resolve these types of common issues.

In some embodiments, the dialog engine can contain a module that performs various kinds of analysis of the logging data, in order to change the future behavior of the dialog engine and better customize dialog to a particular user based on prior usage. This feedback-based learning module may use a variety of statistical and machine-learning techniques to learn any of the following:

Long-term user preferences for a particular user;

Common dialog control information (triggers), including:
  Relationships between concept nodes in different regions of the knowledge map (triggers confirming a node);
  Relevance of taxonomies based on confirmed concepts (triggers creating goals or adding/removing taxonomies); and
  Commonly targeted information (parameterized queries (PQs)).

Long term user preferences, discussed above, can be learned not only by observing the selections a particular user makes during the dialogs she engages in, but also by comparing behavior of different users seeking the same information (as evidenced by common set of concepts confirmed, similar documents viewed, actions executed and/or parameterized queries (PQs) chosen). Learning dialog control information involves analyzing the progression of various dialogs to extract correlations between sets of confirmed nodes and other confirmed nodes. The tags of the documents viewed by the user are of particular interest since they represent areas of interest to the user. Learning control information involves discovering ways to guess earlier in the dialog what distinctions will be most useful for reaching a narrow answer set as quickly as possible.

In one embodiment of the subject invention, it is envisioned that the system could log the data, apply known machine learning techniques, and feed analysis back into the system to provide a mechanism by which the system "learns" from prior user query patterns. In another embodiment, the feedback-based learning module learns a mapping from selected user profile data (including meta-data and concept-node tags) and confirmed or preferred concept-nodes to other preferred concept-nodes. In other words, this map indicates, for users with given properties, at a given point or points in a dialog, what other concept-nodes may be considered as "preferred" by the dialog engine for its next response(s). This learning is based on a statistical analysis of previous usage that analyzes users' document selections. The concept-node tags of the documents, the users' properties, and the confirmed and preferred concept-nodes within the dialog iteration where the document was selected, plus the same information for iterations prior to the document's selection, are all inputs into the learning module that learns the mapping described. In yet another embodiment, the feedback-based learning module learns points at which triggers could be inserted. This learning is based on a statistical analysis of previous usage that analyzes users' traversal paths and success rates (as measured, for example, by selecting a document and subsequently exiting the dialog). Concept nodes A and B in distinct taxonomies that co-occur on many traversal paths of successful dialogs such that A occurs before B might be candidates for a trigger from A to B. In still another embodiment, the feedback-based learning module learns mapped parameterized queries (PQs) and the set of nodes that must be confirmed to trigger the display of the parameterized query (PQ). This learning is based on a statistical analysis of previous usage that analyzes confirmed nodes, document selections, and success rates, and looks for occurrence of a set of confirmed nodes and a particular document selection in many successful dialogs.

Any and all of the following information sources may be used by the learning module:

confirmed (accepted and rejected) concepts;

questions user chose to ignore in the course of a dialog;

questions user explicitly declined to answer;

documents viewed in the course of a dialog;

PQs selected in the course of a dialog;

actions executed in the course of a dialog;

tags of the documents/PQs viewed;

information about the length of time the user spent on particular documents viewed; and final outcome of the dialog interaction.

Now that the major elements of the present invention have been introduced, the specification will now describe the process performed by dialog engine 232 as it resolves a user request for information. Each separate cycle of system question and user answer is referred to as a dialog iteration. During a typical dialog, dialog engine 232 will support multiple iterations. In each iteration, dialog engine 232 analyses user inputs up to that point in the dialog and presents the user with new questions, documents and actions (e.g., contact a customer service representative). That is, the dialog engine inputs concept nodes (among other things), updates its state with new constraints (limit the available concept nodes) and preferences (modify the ranking of nodes and documents), and outputs resolutions and new questions to the user. The user can choose to accept one of the resolutions or continue the dialog by answering more questions. In essence, the user's answers create additional constraints and preferences that further limit and rank the space of available concept nodes in a knowledge map. Discovering the best set of concept nodes will cause the presentation to the user of that set of knowledge containers that is most likely to contain a problem resolution.

In one embodiment of the present invention, a multi-step dialog begins with the user of the system entering via either boxes where they can type text, or selection lists of possible choices, a combination of:

a) query text (possibly added to the query text from a previous step), b) desired administrative meta-data values; e.g. desired date ranges for creation-date of knowledge containers to be retrieved, c) taxonomy tags and weights (perhaps segmented for ease of entry; e.g. "Very relevant", "Somewhat relevant", "Not relevant") to be associated with the question;

d) taxonomic restrictions, used as described above (with respect to retrieval techniques) to limit the areas of taxonomies from which response knowledge containers are drawn; and e) User preferences.

All the sources of information available to the system are used in the process of advancing a subgoal. The advancing mechanism can make use of autocontextualization information, user preferences, confirmed nodes (e.g. information already verified in the course of interaction up to this point), nodes explicitly specified by the dialog designer, or any other information source available. Since it is assumed the underlying information need of the user does not change in the course of a single dialog, the dialog engine can always use confirmed nodes to advance goals. However sometimes other information can not be fully trusted. In particular, autocontextualization, being an automatic process, can make mistakes. Therefore it may not be safe to assume that correct concept tags have been extracted from the query. User preference information, though human-entered, may be outdated. For example, it may state in user's profile that they own a black-and-white HP LaserJet printer. However in the course of the interaction their problem was established to be that of color printing. Clearly, previous printer information is no longer relevant. Thus, whether or not subgoal focus is advanced to a concept because it appears in user preferences, autocontextualized nodes, or other source of node information is governed by a goal parameter whose value is set by the dialog designer. This approach provides maximum flexibility by allowing the use of precisely as much information as appropriate in each situation. In addition, another goal parameter governs whether or not the user is asked to verify the conclusions inferred by the system.

Figure 12:
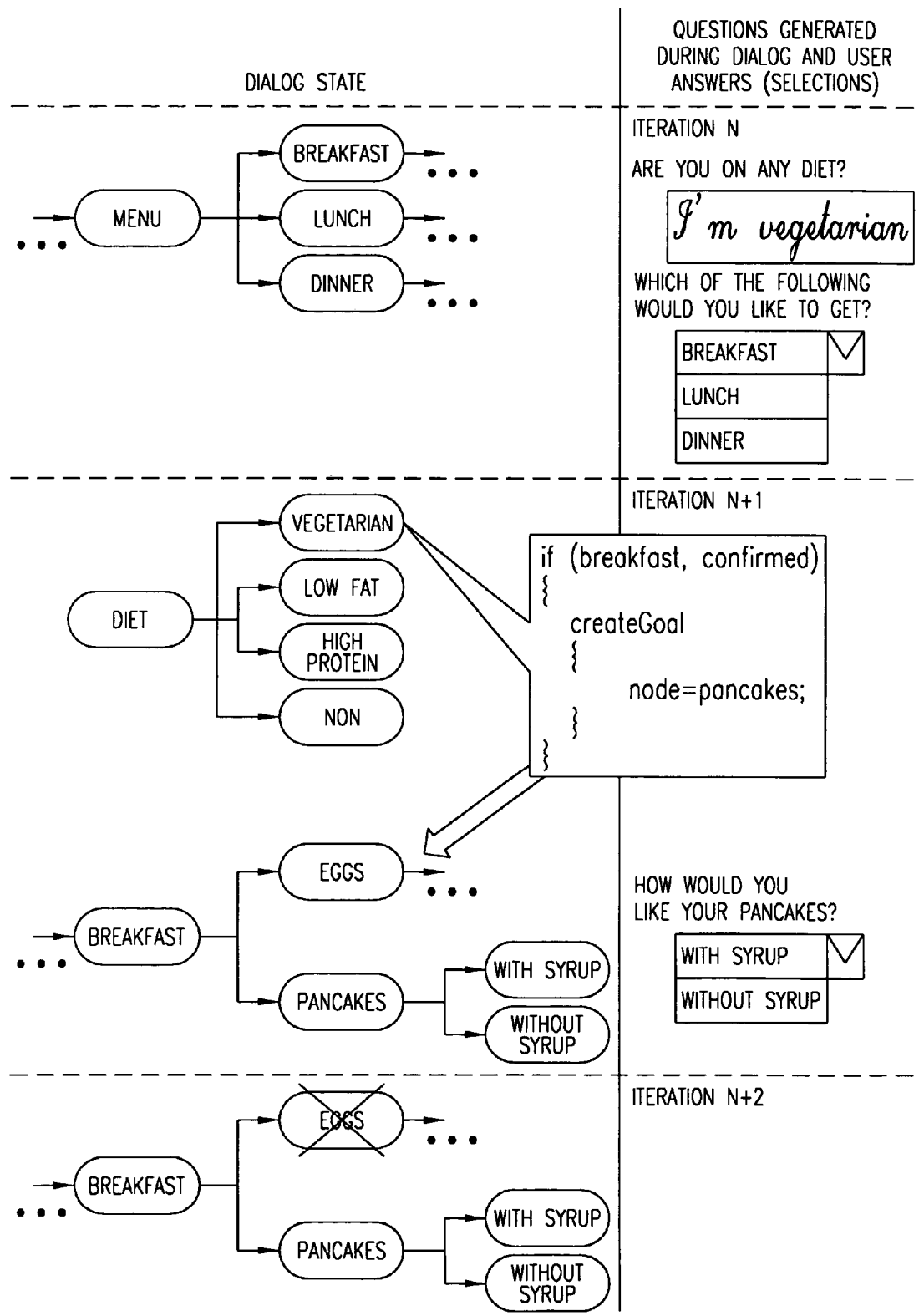
FIG. 12 is a drawing illustrating the goal unification process in accordance with an embodiment of the present invention.

One additional source of information in the system are newly created goals. It may happen that a goal is created in a taxonomy where another goal already exists. If the goals are created in the same context, the new one can contain additional information that was not available at the first time the goal was created. For example, if a goal was created in the Diet taxonomy (FIG. 12) rooted at the top level in the Vegetarian node and later on a new goal rooted at Menu is created, the system should take into account that the user wishes to order breakfast, not just any vegetarian meal, is relevant to the problem at hand. Thus, the focus of the subgoal in the Menu taxonomy is moved to Pancakes. The process of combining information contained in two goals in the same taxonomy is called goal unification. Goal unification considers the root nodes of the two goals in question and the focus(es) of the older goal. Three cases are possible:

A focus of the existing goal is below the root of the new goal—in this case the existing goal already contains more specific concept than the new one, so no new information is used;

The root of the new goal is below a focus of the existing goal—in this case the new goal gives more specific concept node information, and the focus is advanced down to the root of the new goal; or The root of the new goal is not in the path of the root of the existing goal—in this case the new goal deals with a new region of taxonomy that has not yet been explored and a new subgoal is created to explore that region.

As mentioned above, dialog engine 232 generates follow-up questions to the user in the process of resolving active goals. The type of question to be generated can be specified by the dialog designer. The answers to these questions advance the state of the subgoal to a new location in the taxonomy—e.g. change the focus of the subgoal. Changing the focus of a subgoal may be by path traversal within the knowledge map (e.g., the focus may change from parent node to child node). Autocontextualization can be used to jump to a specific place in the taxonomy and the dialog designer can explicitly specify a place to jump to. In any event, the node-to-node path taken by dialog engine 232 from the focus node(s) to the target node(s) heavily depends on user responses to system questions. For example, a selection algorithm may be applied to a focus node, F to produce a set of concept nodes, C which are associated with a question posed to the user (or to the application screen). If the user (or the screen) responds to this question, the response is mapped to one or more members, M of the set C. These members, M, become the focus node, F in the set of focus nodes for the next dialog iteration. As described below, the target nodes may also change with each dialog iteration.

The dialog engine 232 may then create a new entry screen for the user that represents the system's response in this step of the dialog and allows the user to enter their next query in the conversation via various entry areas on an application screen. This response can include one or more of:

(1) Knowledge container results: a list of zero or more knowledge containers that the system considers possible "answers" or highly relevant information to the user's question. These can be presented as clickable links with meta-data indicating the knowledge container's title, synopsis, dates, author, etc., where clicking will lead the user to a screen presenting the full content of the knowledge container; alternatively, if the system has one or more knowledge containers that it believes with high confidence will serve as answers to the user's question, it can simply display the full content of those knowledge containers directly.

(2) Follow-up Questions: In order to advance a particular dialog, follow-up questions are generated based on the current state of the dialog. As shown in FIG. 13, there are four categories of follow-up questions (clarifying questions, document questions, text questions, and parameterized questions). The invention analyses the dialog state at each iteration of a dialog and uses that information to determine what types of follow-up questions to generate and what choices to offer the user in each question instance. The dialog state may be viewed as having several different levels of specificity and the invention provides the dialog designer with the ability to generate different question types appropriate to those various levels. Depending on the characteristics of the taxonomy in which a goal is being resolved and position of a focus node within that taxonomy, the dialog designer may be provided with various means of defining which choices to offer to the user. By determining which choice options the user is presented with, the dialog designer controls the pace and direction of movement of the subgoal focus and the creation of new goals in other taxonomies.

There are three levels of specificity that provide the dialog designer with a point at which to define follow-up questions: (1) the focus node level; (2) the active taxonomy level; and (3) the confirmed node state level. Each of these levels provides a different starting point for applying a selection algorithm (discussed below) to the surrounding taxonomic landscape for identifying a set of nodes. It is important to note that not all selection algorithms are appropriate for every level of specificity. Selection at the focus node level starts from a single node, the current subgoal focus node. This view could include the focus node's parent, siblings and immediate children. Depending on the selection algorithm's distance metric, the selection set will most likely be limited to nodes within the current goal's taxonomy. In contrast, the selection at the taxonomy level starts from the entire set of nodes in a taxonomy. Selection at the confirmed node state level starts from the confirmed node set. At this level, the dialog designer 'sees' the state of the dialog as a set of nodes that the user has explicitly selected or has implicitly identified through the autocontextualization of user inputs. Various embodiments of the invention would define follow-up question types that are specific to each of these levels of specificity. Each of the levels of specificity allows the invention to apply a selection algorithm to a particular set of concept nodes which can be offered to the user. Many criteria could be used to determine the exact set of nodes available to be included in a selection set. Among these are:

Taxonomic nearness—Nodes are selected on the basis of traversal distance from the focus node with nearer nodes being preferred over more distant nodes.

Dialog designer selection—A means is provided for the dialog designer to select nodes for inclusion in or exclusion from selection sets. The latter represents a special case, in that the dialog designer should have the ability to designate certain concept nodes as being invisible for the purposes of generating a selection set. These invisible nodes serve as taxonomic structural elements but would be meaningless to the user as a selection in a selection set. Such a node has all the normal characteristics of a standard concept node except for visibility in selection sets.

Knowledge container (KC) tag overlap—The set of knowledge containers still available for selection provide a tag set that can be used to generate a selection set. In one embodiment, that set is analyzed for tag overlap, meaning those tags are preferred which occur in the greatest number of remaining knowledge containers (KCs) and/or have the highest cumulative tag weight. In another embodiment, when the remaining knowledge container (KC) set is sufficiently small, the selection set is the entire set of nodes tagged to those documents. Other possible selection criteria include nodes with tags into the remaining knowledge containers (KCs) that are closest to a subgoal focus as measured by some distance-metric or that set of concept nodes tagged into selected clusters of knowledge containers (KCs).

Vocabulary similarity—Those nodes are selected whose vocabulary (term set) is most similar to the focus node's vocabulary.

Previous display/confirmation status—In general, it is desirable to not redisplay selection choices that have previously been offered to the user or have been confirmed by user selection or some other means.

In one embodiment of the invention, classes of follow-up questions will be implemented that embody various combinations of specificity levels and selection set choice criteria. As a general rule, a particular class of follow-up questions would be defined at one level of specificity and provide a single selection set defined by one or more criteria. In another embodiment, a class of follow-up questions would include multiple levels of specificity and present the user with multiple selection sets in a single instance of a follow-up question.

Figure 14:
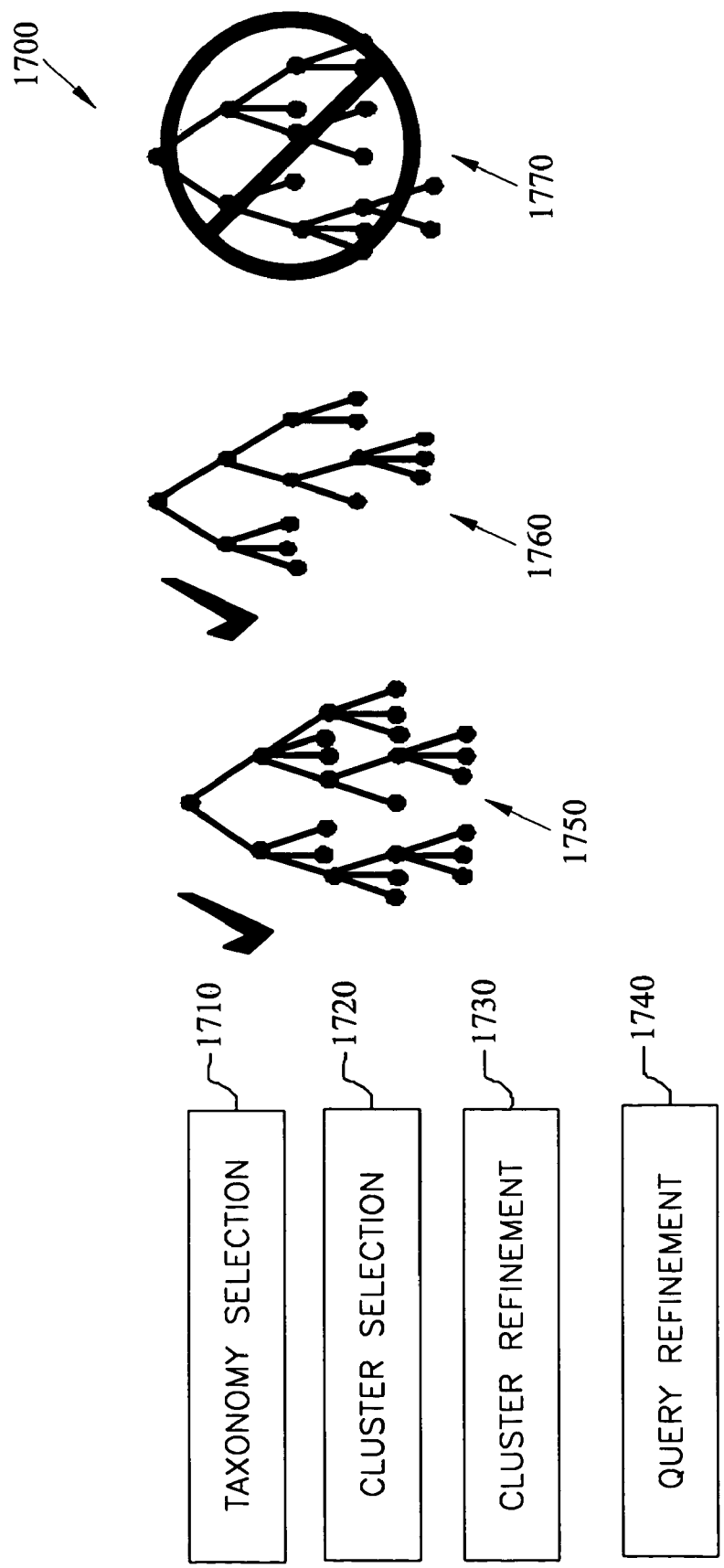
FIG. 14 shows a step in the interactive dialogue where the user can choose among the taxonomies.

In another embodiment, the dialog designer is provided with the ability to define a class of follow-up questions at the focus node level called clarifying questions (CQs). Clarifying questions (CQs) represent the most basic follow-up question type and would be the type seen most frequently by users. This would be the default question type generated from a goal if another question type is not requested by the dialog designer. These clarifying questions are constructed in a variety of ways:

a) Taxonomy selection: Users may be asked to indicate which of the returned taxonomies are relevant or irrelevant to the question at hand. For example, referring to FIG. 14, there is shown a typical user interface 1700 comprised of four "buttons" 1710-1740. When the user presses the taxonomy selection button 1710, the user is presented with taxonomies 1750-1770. The system may then ask the user if geographic considerations (as an example) are an important aspect of the user's question, based on tagging the question via autocontextualization to a geography taxonomy. The user's response to this type of question is added to the taxonomic restrictions of the user's question, resulting in the system discarding taxonomy 1770, which leads to a more precise response in the next round of the dialog;

b) Concept-node selection: Similar to region selection and adjustment, the application screen can allow users to select concept-nodes to add, remove, emphasize, or de-emphasize. The screen can display, for example, the concept-nodes returned by the system, along with possibly parent and child nodes, for selection. The user may choose to eliminate or add nodes from consideration. These can either be cast as restrictions—e.g. "My question has nothing to do with this concept", requirements—"My question is specifically about this concept (or its sub-concepts)", or preferences—"Emphasize or de-emphasize this concept". Restrictions and requirements are added to the taxonomic restrictions of the user's question for the next round of the dialog; preferences are added to the taxonomy tags passed in with the user's question for the next round of the dialog; and c) Terminology selection: The system may use the autocontextualization process to select a list of "related terminology" and present the list to the user, who may select one or more of the terms listed to be added to the question text. Clarifying questions (CQs) are specific to the subgoal focus level.

In one embodiment, a clarifying query (CQ) is displayed as a text string and a list box offering a selection of concept nodes. The list of nodes presented to the user includes the taxonomic neighborhood of the subgoal focus minus any confirmed nodes and any nodes that have been previously offered as choices to the user. The dialog designer has the ability to define the text string for each node to be displayed as that node's designator in a clarifying query (CQ) list box. If the value isn't defined, the node's description is used. Selecting a node from this list confirms that node and advances the subgoal focus to that node. It may also resolve the goal, depending on goal type and the taxonomic location of the selected node. The relative position of a subgoal focus within the dialog state provides one other criteria which can be used by the dialog designer in defining follow-up questions. The beginning and end of goal resolution are potentially unique cases because they may have abnormally large or small selection sets using the abovementioned possible criteria for set inclusion.

In the case where the selection set may be abnormally large, another follow-up question type, referred to as a text question (TQ), can be made available that allows the dialog designer to avoid displaying that selection set to the user. A text question (TQ) is intended for use in locations within a taxonomy where simply listing a node's neighboring nodes (as would be done with a clarifying query (CQ)) would make for an overly long selection list or might require several iterations of a dialog to get information that might be obtained by a single answer from the user. Like a clarifying query (CQ), a text question (TQ) is specific to the subgoal focus level, but in the place of a selection set, the user is given a text box and is prompted to type in the desired selection. For example, if the dialog designer would like to ascertain what a customer would like to order in a restaurant, rather than list the huge selection of possibilities from the menu, the user can simple be prompted to type in their selection. The user's response is autocontextualized within the goal's taxonomy and all current constraints are applied. Any tagging outside the set of concept nodes of interest is ignored. Referring now to FIG. 15, it is illustrated that rather than presenting the user with a list of potentially hundreds of menu items, the user can type in his or her menu selection and thus answer the question in one iteration of a dialog. If the user's response autocontextualizes to a known menu item, that information points the dialog to the correct subgoal focus. Nodes identified by autocontextualization may become confirmed. If, however, the user's response is not recognized by the autocontextualizer, the text question (TQ) would be followed by a standard clarifying query (CQ) listing all the possible next choices. Regardless of whether the user's typed entry autocontextualizes successfully, follow-up questions will be generated until the target set of concept nodes is reached.

Claryifying questions (CQs) are a simple means of advancing the focus of a subgoal towards resolution, advancing the focus one taxonomic level at a time towards a resolved state. In some cases, this doesn't give enough power or flexibility to the dialog designer. One such case is when the user has advanced a subgoal focus to its resolution and user wishes to continue the dialog. In one embodiment, the dialog designer will be provided with a follow-up question type that defines its selection set from the concept nodes tagged to the remaining document set (that is, nodes tagged to those documents that abide by constraints in the existing constraint set), optionally restricted to those concept nodes within the goal taxonomy. This type of follow-up question is known as a document-based question (DQ). As shown in FIG. 16, a document-based question (DQ) presents the user with choices, based on the knowledge containers (KCs) remaining.

In many cases, a site will contain a small set of knowledge containers that address a large percentage of the problems that bring users to that site. In one embodiment, the dialog designer will be able to define follow-up questions which allow the user to go directly to any relevant members of that set of particularly useful KCs. These are known as parameterized queries (PQs). Parameterized queries (PQs) relate to the current state of the dialog as a whole, as defined by the set of confirmed nodes. At the end of each cycle of a dialog processing, the current set of confirmed nodes is used to select those parameterized queries (PQs) which best match the dialog state. Depending on the set of defined parameterized queries (PQs) and the state of the dialog, the set of matching parameterized (PQs) may well be empty. Referring to FIG. 17, it is shown how a parameterized query (PQ) can provide a shortcut to resolving a goal by presenting the user with a previously prepared or cached question.

Specifically because parameterized queries (PQs) relate to the dialog state as a whole, they provide a means by which the dialog designer can provide a shortcut to a possible resolution. Thus, in cases when one or a small number of resolutions (as embodied by a particular set of displayed knowledge containers) occurs frequently after a dialog has 'passed through' a certain state, the dialog designer has the option by means of parameterized queries (PQs) of allowing the user to select that resolution directly whenever the dialog reaches that precursor state. For example, for an e-service portal (ESP) site maintained by a manufacturer of printers, it may happen that a frequent user complaint occurs due to failure to correctly reconnect the printer after installing a new device in the computer. That site's dialog designer can create a parameterized query (PQ) keyed to a state early in the identification of a printer problem that would ask the user if the problem has these common characteristics and would, if the user selects that question, cause the display of the knowledge containers most directly related to that problem.

In one embodiment, two subtypes of parameterized queries (PQs) are defined. They differ in how they act once chosen by the user, not in how they are selected for display. The first of these subtypes is a mapped parameterized query (PQ), for which the parameterized query (PQ) is mapped directly to one or more knowledge containers. This parameterized query (PQ) would be used when the set of knowledge containers that would be an appropriate response to the question is stable. But in many cases, the set is not stable. For example, a user of a site may want to see documents that are replaced over time, such as quarterly financial reports. In this case, what is needed is not a mapping to a specific document set, but rather the generation of a question that will retrieve the current incarnation of the desired document set. This capability is provided by the second parameterized query (PQ) subtype, Question parameterized queries (PQs).

The selection set displayed with a parameterized query (PQ) is defined by the dialog designer to cover a known set of valid choices. These choices would, in the case of a mapped parameterized query (PQ), each have one or more documents directly mapped to the parameterized query (PQ) or, in the case of a question parameterized query (PQ), have a non-empty retrieval set for the question formed by the concatenation of the static question text and the user-selected parameter.

Parameterized queries (PQs) are selected for display by a process of matching the concept node set defined for the parameterized queries (PQ) by the dialog designer and the confirmed node set of the dialog state. In one embodiment, the set of confirmed nodes in the current state of a dialog is compared to each parameterized query's (PQ) tag set using a strictness measure which controls which taxonomic relationships between parameterized query (PQ) tags and confirmed nodes is sufficient for inclusion in the retrieval set. This strictness measure tests for parameterized queries (PQs) whose tag set passes the current constraints and is in such a relationship to the confirmed node set that for every taxonomy represented in the confirmed node set, a parameterized query (PQ) tag exists that is in a path relationship (is an ancestor, descendent or an exact match) to a confirmed node or else no parameterized query (PQ) tag is tagged to that taxonomy, and, finally, at least one parameterized query (PQ) tag must have that path relationship. The set of parameterized queries (PQs) that passes the constraint and strictness tests is ranked based on the strength of the tag matches.

Figure 18:
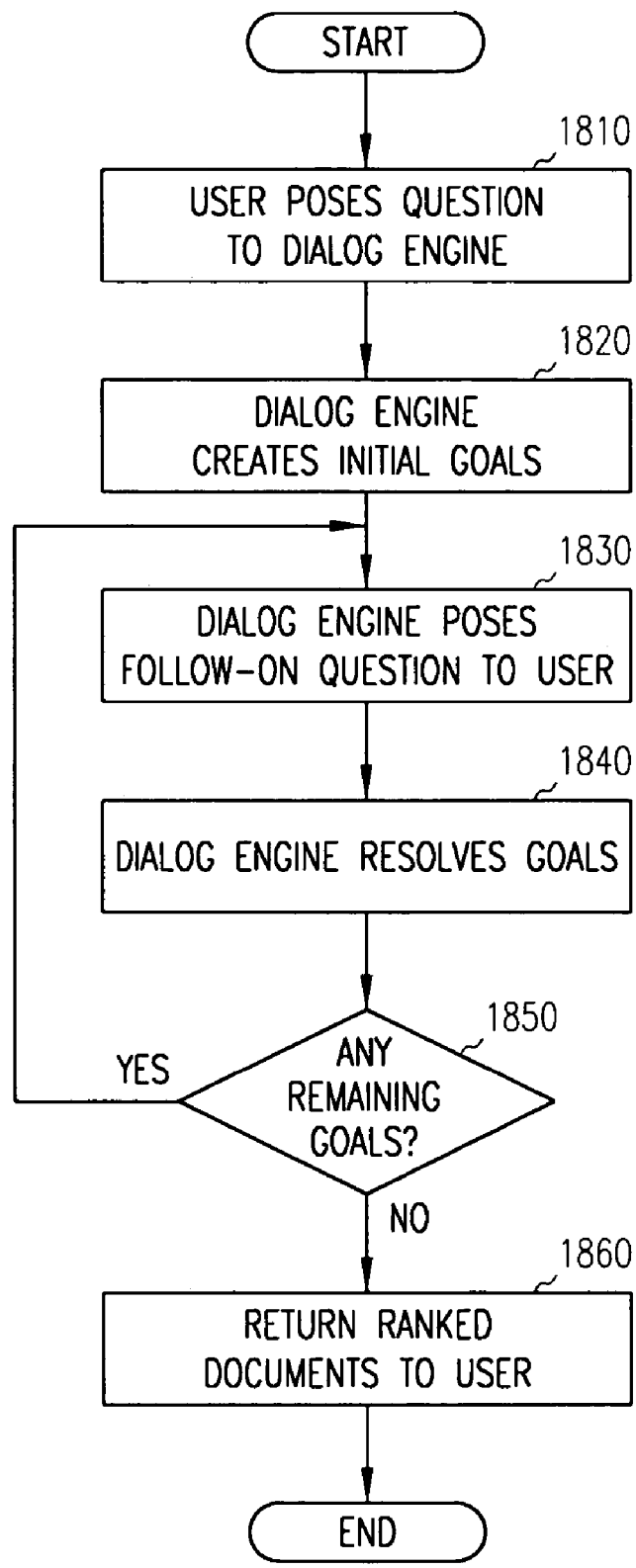
FIG. 18 is a flow chart showing the operation of the multi-step interactive dialog system in a manner consistent with the present invention.

FIG. 18 is a flowchart depicting the steps performed by dialog engine 232 as it resolves a user query. A user of the present invention starts a dialog with dialog engine 232 by directing a browser 132 to a designated starting web page. This web page asks the user some initial questions. As shown in step 1810, the user's responses are returned to dialog engine 232 in the form of a dialog request. During program execution, a question is received by dialog engine 232 via browser 132 on a client computing device 2 and 12. Next in step 1820, dialog engine 232 creates initial goals through the use of triggers. Processing then flows to step 1830 at which time dialog engine 232 creates a response to the user that may include zero or more follow-up questions, relevant documents and related concepts from the knowledge map. Dialog engine 232 communicates with a user via an application screen associated with browser program 132. Dialog engine 232 sends its output to the application screen to be displayed and receives responses from the application screen. The application screen poses the questions to the user and based on the user's response returns nodes back to the dialog engine to begin the next iteration. Any information that the user can provide, the application screen can be programmed to give to the dialog engine without any action on the user's part.

For example, the dialog engine could ask whether the user is a novice or expert. An application screen designed for novices could provide this information without posing the question to the user. After dialog engine 232 receives a response from the user, it incorporates user answers into the state data. With the additional insight provided by the follow-up questions, dialog engine in step 1840 resolves the goals. Processing then flows to step 1850, where dialog engine determines whether there are any unresolved goals. If there are, processing flows back to step 1830. If there are no more goals remaining, dialog engine 232 retrieves the documents, knowledge containers, actions, etc., that satisfy the dialog constraints, each with a raw-text-score that reflects the quality of its match to the query text. The raw-text-score is multiplied by a constant to produce a final text-score. Next, the document's tags are matched against the tags in the various node lists that make up the dialog state (i.e., the topic spotter or autocontextualized node list, the confirmed node list, the user preference node list, and the dialog preference node list).

When there's a match, the document's tag weight is multiplied by a constant associated with the selected node list, and aggregated with each other value from tag matches to that node list to produce a node-list-score for each node-list. The text-score and node-list-scores are combined to produce a final score for the document. All the retrieved documents, knowledge containers, actions, etc., are then rank ordered by this score and returned to the user (step 1860).

Figure 19:
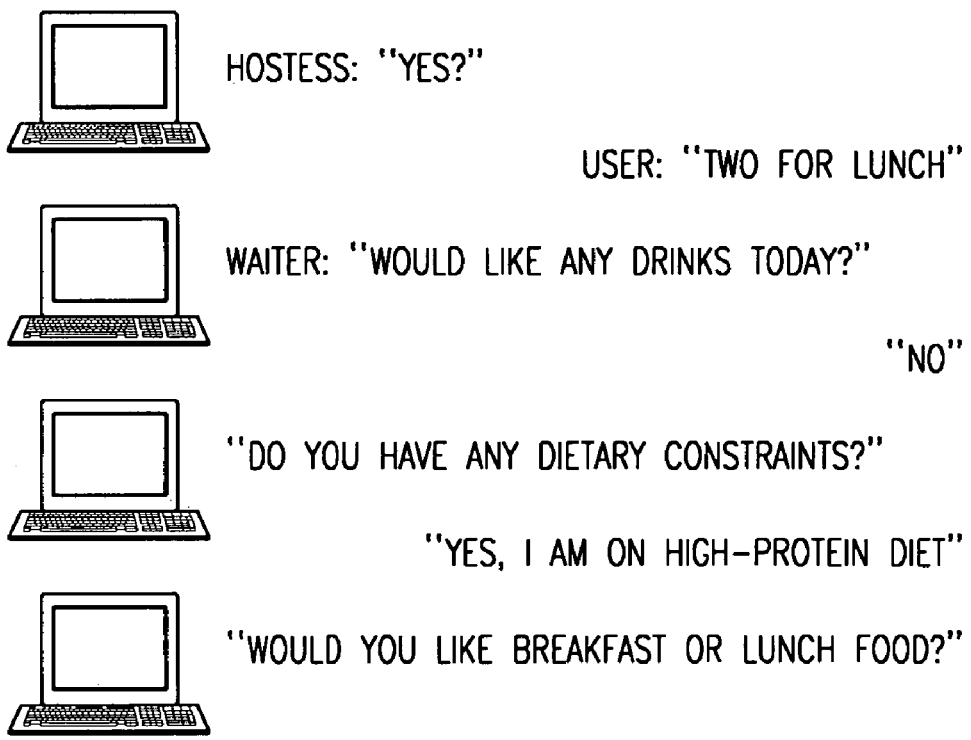
Figure 20:
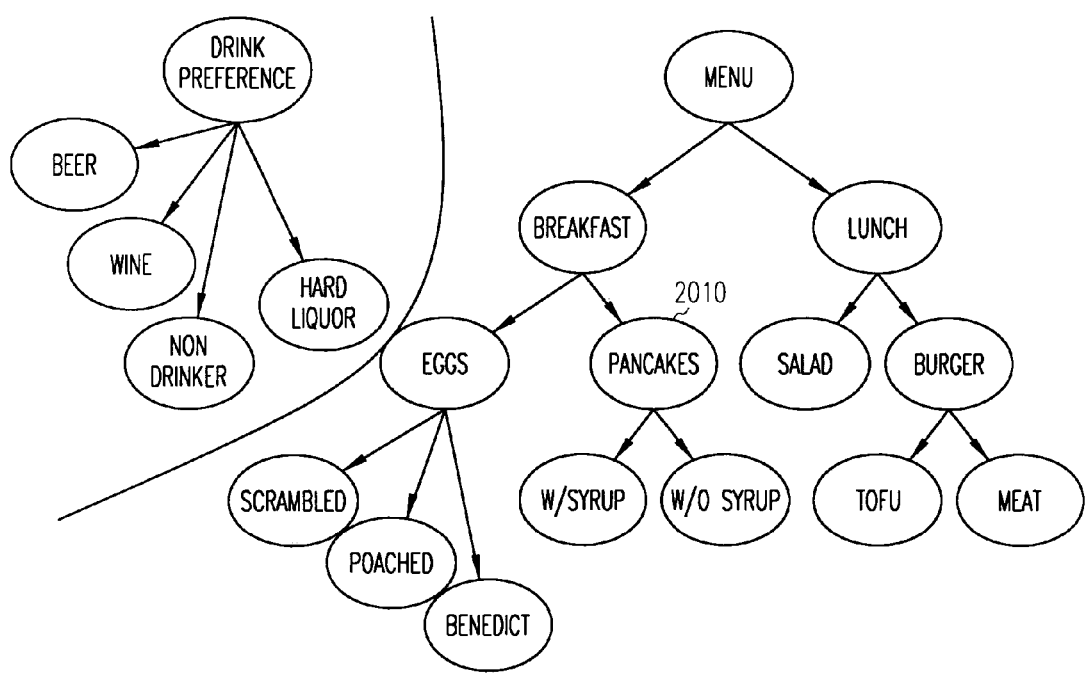

To further illustrate the principles of the present invention, a practical example of a dialog is provided in FIGS. 19-21. Consider the situation that occurs when a person walks into a restaurant to order a meal. For the purposes of this example, assume that all service in this particular restaurant are provided by the present invention with the help of robots to deliver "documents" (or dishes) to the customers. The goal of this dialog is to get the right dishes to the customer. As shown in FIG. 19, sample dialog begins when the hostess prompts the user with the question "Yes?" In response, the user responds with an answer "Two for Lunch." Referring to FIG. 19, it is shown that this answer resolves one goal of the dialog. That is, it identifies the correct meal. The waiter then prompts a user with a follow-up question "We have eggs and pancakes. What would you like?" The user's answer further refines the number of available nodes by eliminating the "Pancakes" node 2010 (FIG. 20) from the Transaction goal. This iterative process continues until the dialog engine fully satisfies the user's requests as shown in FIG. 21.

From the foregoing description, it will be appreciated that the present invention provides an efficient system and method for conducting a multi-step interactive dialog with a user over a computer network. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIG. 18. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method, comprising:
   determining at least one member of a concept set satisfies a predicate of a trigger;
   limiting relevant areas of a knowledge map using the predicate of the trigger;
   restricting or preferring relevant documents to those documents that are tagged to the relevant areas of the knowledge map; and
   providing stored information to a user or a process using at least an indication of the restricted or preferred relevant documents that are tagged to the relevant areas of the knowledge map.

2. The method of claim 1, comprising at least one of:
   if the predicate of the trigger comprises an AT predicate, then the limiting relevant areas of the knowledge map comprises limiting to a specified concept node of the AT predicate;
   if the predicate of the trigger comprises an UNDER predicate, then the limiting relevant areas of the knowledge map includes limiting to a specified node and descendants of the specified node of the UNDER predicate;
   if the predicate of the trigger comprises a PATH predicate, then the limiting relevant areas of the knowledge map includes limiting to a specified node, ancestors of the specified node, and descendants of the specified node of the PATH predicate;
   if the predicate of the trigger comprises an ABOVE predicate, then the limiting relevant areas of the knowledge map includes limiting to nodes above a specified node of the ABOVE predicate;
   if the predicate of the trigger comprises a CONTAINS-ONE-OF predicate, then the limiting relevant areas of the knowledge map includes limiting to nodes that contain at least one of the nodes in a list of nodes of the CONTAINS-ONE-OF predicate;
   if the predicate of the trigger comprises a CONTAINS-ALL-OF predicate, then the limiting relevant areas of the knowledge map includes limiting to nodes in a list of nodes of the CONTAINS-ALL-OF predicate;
   if the predicate of the trigger comprises a PREFERENCE predicate, then the limiting relevant areas of the knowledge map includes limiting to at least one node in a list of nodes of the PREFERENCE predicate, and the restricting or preferring consists of preferring;
   if the predicate of the trigger comprises a LEAF predicate, then the limiting relevant areas of the knowledge map includes limiting to leaf nodes of the LEAF predicate;
   if the predicate of the trigger comprises a ROOT predicate, then the limiting relevant areas of the knowledge map includes limiting to root nodes of the ROOT predicate;
   if the predicate of the trigger comprises a PARENT predicate and a specified node of the PARENT predicate includes child nodes, then the limiting relevant areas of the knowledge map includes limiting to the specified node of the PARENT predicate;
   if the predicate of the trigger comprises a HAS-DOCUMENTS predicate and any documents are tagged to a specified node of the HAS-DOCUMENTS predicate, then the limiting relevant areas of the knowledge map includes limiting to the specified node of the HAS-DOCUMENTS predicate;
   if the predicate of the trigger comprises a NOT-AT predicate, then the limiting relevant areas of the knowledge map includes excluding a specified node of the NOT-AT predicate from the relevant areas of a knowledge map;
   if the predicate of the trigger comprises a NOT-UNDER predicate, then the limiting relevant areas of the knowledge map includes excluding a specified node and descendants of the specified node of the NOT-UNDER predicate from the relevant areas of a knowledge map;
   if the predicate of the trigger comprises an UNDER-IF-TAGGED predicate, then the limiting relevant areas of the knowledge map includes limiting to a specified node and descendants of the specified node of the UNDER-IF-TAGGED predicate, and the restricting or preferring includes restricting relevant documents to those documents that are tagged to the limited relevant areas and to documents that are not tagged to a taxonomy of the specified node of the UNDER-IF-TAGGED predicate;

if the predicate of the trigger comprises a PATH-IF-TAGGED predicate, then the limiting relevant areas of the knowledge map includes limiting to a specified node, ancestors of the specified node, and descendants of the specified node of the PATH-IF-TAGGED predicate, and the restricting or preferring includes restricting relevant documents to those documents that are tagged to the limited relevant areas and to documents that are not tagged to a taxonomy of the specified node of the PATH-IF-TAGGED predicate.

3. The method of claim 2, further comprising evaluating a compound predicate of a trigger, the compound predicate comprising at least one Boolean operator and at least two predicates selected from the group consisting of AT, UNDER, PATH, ABOVE, CONTAINS-ONE-OF, CONTAINS-ALL-OF, PREFERENCE, LEAF, ROOT, PARENT, HAS-DOCUMENTS, NOT-AT, NOT-UNDER, UNDER-IF-TAGGED, and PATH-IF-TAGGED.

* * * * *